US012707225B2

(12) United States Patent
Mohammed

(10) Patent No.: US 12,707,225 B2
(45) Date of Patent: Aug. 11, 2026

(54) SPATIAL AUDIO GENERATION

(71) Applicant: QUALCOMM Incorporated, San Diego, CA (US)

(72) Inventor: Rashed Mohammed, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 18/450,557

(22) Filed: Aug. 16, 2023

(65) Prior Publication Data

US 2025/0063320 A1 Feb. 20, 2025

(51) Int. Cl.

*H04S 7/00* (2006.01)
*H04R 3/00* (2006.01)
*H04R 5/027* (2006.01)
*H04R 5/033* (2006.01)

(52) U.S. Cl.

CPC ............. *H04S 7/304* (2013.01); *H04R 3/005* (2013.01); *H04R 5/027* (2013.01); *H04R 5/033* (2013.01); *H04S 2400/11* (2013.01); *H04S 2400/15* (2013.01); *H04S 2420/11* (2013.01)

(58) Field of Classification Search

CPC .......... H04S 7/302; H04S 7/304; H04S 7/303; H04S 2400/11; H04S 2400/13; H04S 2400/15; H04S 2420/11; H04R 1/1083; H04R 3/005; H04R 5/027; H04R 5/033; H04R 5/04; H04R 2420/07

USPC .......................................................... 381/303

See application file for complete search history.

(56) References Cited

U.S. PATENT DOCUMENTS

2016/0112811 A1* 4/2016 Jensen ................ G10L 21/0232 381/17
2020/0396537 A1* 12/2020 Solvang .................... G06T 7/20
2024/0056762 A1* 2/2024 Lian ....................... H04R 5/033

FOREIGN PATENT DOCUMENTS

CN 113436635 A 9/2021
WO 2022227921 A1 11/2022

OTHER PUBLICATIONS

International Search Report and Written Opinion—PCT/US2024/041653—ISA/EPO—Feb. 26, 2025.
Partial International Search Report—PCT/US2024/041653—ISA/EPO—Dec. 3, 2024.

* cited by examiner

*Primary Examiner* — Paul Kim
(74) *Attorney, Agent, or Firm* — QUALCOMM Incorporated; Espartaco Diaz Hidalgo

(57) ABSTRACT

A device includes memory configured to store audio data and one or more processors configured to obtain the audio data captured by a microphone of a wearable device. The instructions further cause the one or more processors to determine, based on one or more signals exchanged between the wearable device and a reference device, directionality information indicative of a direction of the microphone relative to the reference device. The instructions also cause the one or more processors to process the audio data based on the directionality information to generate spatial audio data.

30 Claims, 9 Drawing Sheets

SPATIAL AUDIO GENERATION

I. FIELD

The present disclosure is generally related to audio processing, and in particular to generation of spatial audio data.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often incorporate functionality associated with communications and media generation. For example, such computing devices often support features such as voice calls, video calls, multi-party calls (e.g., teleconferencing and videoconferencing), gaming, multimedia capture, or combinations thereof.

During use of many of these features, audio is captured locally and saved or sent to another device, and a richer audio experience can be provided using spatial audio. Commonly, audio data is generated, stored, and/or rendered as channel-based audio (such as mono-channel audio, stereo-channel audio, 5.1 channel audio, etc.), in which each channel represents an output stream. In contrast, spatial audio data includes data representing objects or sound sources and output channels are generated as part of rendering the spatial audio data. For example, spatial audio can be rendered so that speech represented in the output audio sounds like it is coming from the direction of a person who is speaking. Unfortunately, capturing spatial audio data generally requires the use of complicated, special-purpose microphone arrays. Because of the complexity and expense of such microphone arrays, it is challenging and cost prohibitive to generate spatial audio for everyday use.

III. SUMMARY

In a particular aspect, a device includes memory configured to store audio data and one or more processors configured to obtain the audio data captured by a microphone of a wearable device. The instructions further cause the one or more processors to determine, based on one or more signals exchanged between the wearable device and a reference device, directionality information indicative of a direction of the microphone relative to the reference device. The instructions also cause the one or more processors to process the audio data based on the directionality information to generate spatial audio data.

In a particular aspect, a method includes obtaining, at one or more processors, audio data captured by a microphone of a wearable device. The method also includes determining, by the one or more processors, directionality information indicative of a direction between the microphone and a reference device based on one or more signals exchanged between the wearable device and the reference device. The method further includes generating, at the one or more processors, spatial audio data based on the audio data and the directionality information.

In a particular aspect, a non-transitory computer-readable device stores instructions that are executable by one or more processors to cause the one or more processors to obtain audio data captured by a microphone of a wearable device. The instructions further cause the one or more processors to determine directionality information indicative of a direction between the microphone and a reference device based on one or more signals exchanged between the wearable device and the reference device. The instructions also cause the one or more processors to generate spatial audio data based on the audio data and the directionality information.

In a particular aspect, an apparatus includes means for obtaining audio data captured by a microphone of a wearable device. The apparatus also includes means for determining directionality information indicative of a direction between the microphone and a reference device based on one or more signals exchanged between the wearable device and the reference device. The apparatus further includes means for generating spatial audio data based on the audio data and the directionality information.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

FIGS. 5, 6, 7, 8, and 9 are diagrams illustrating various non-limiting examples of devices operable to interact to generate spatial audio data in accordance with some examples of the present disclosure.

Figure 1:
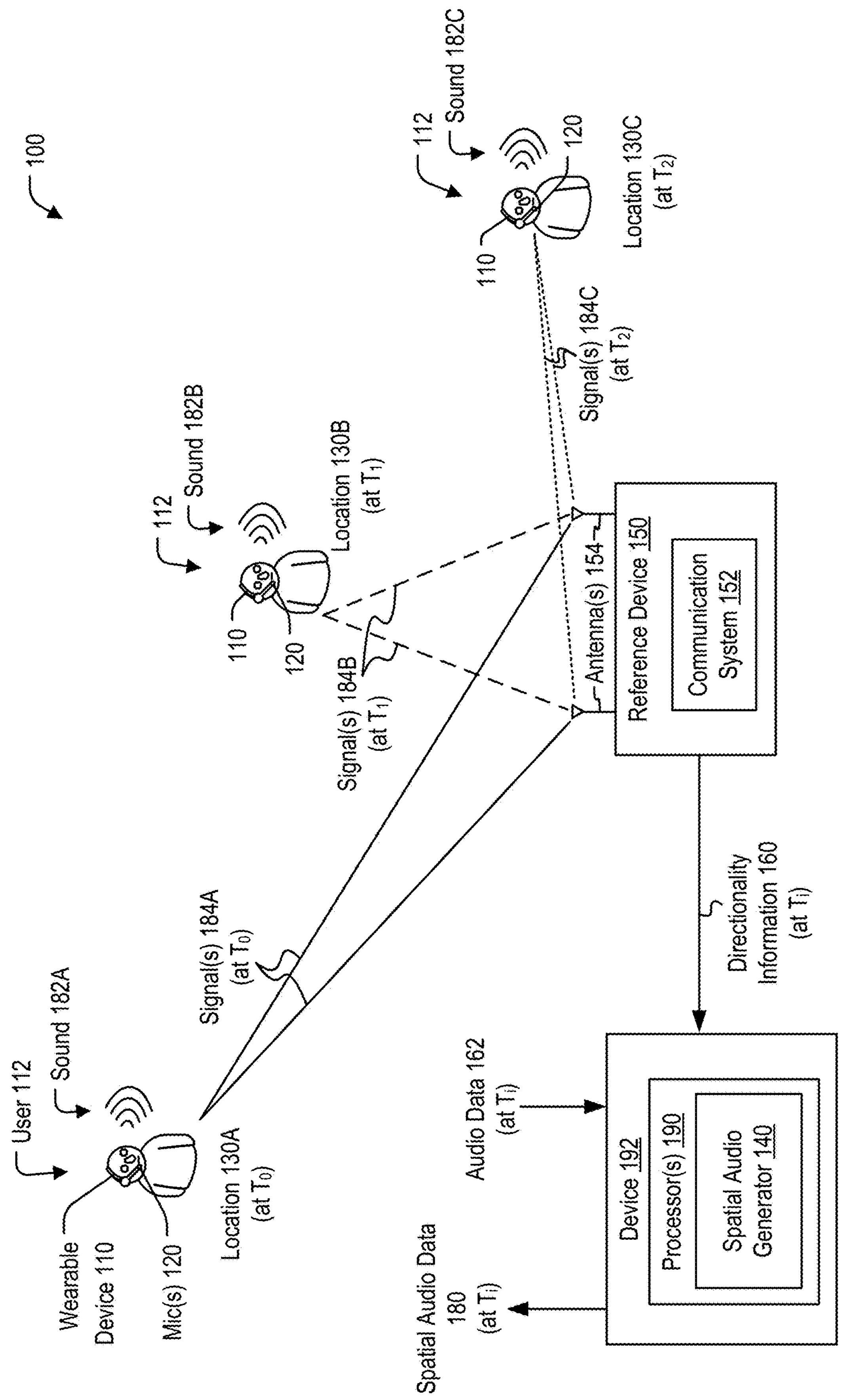
FIG. 1 is a diagram of a particular illustrative aspect of a system operable to generate spatial audio data in accordance with some examples of the present disclosure.
Figure 10:
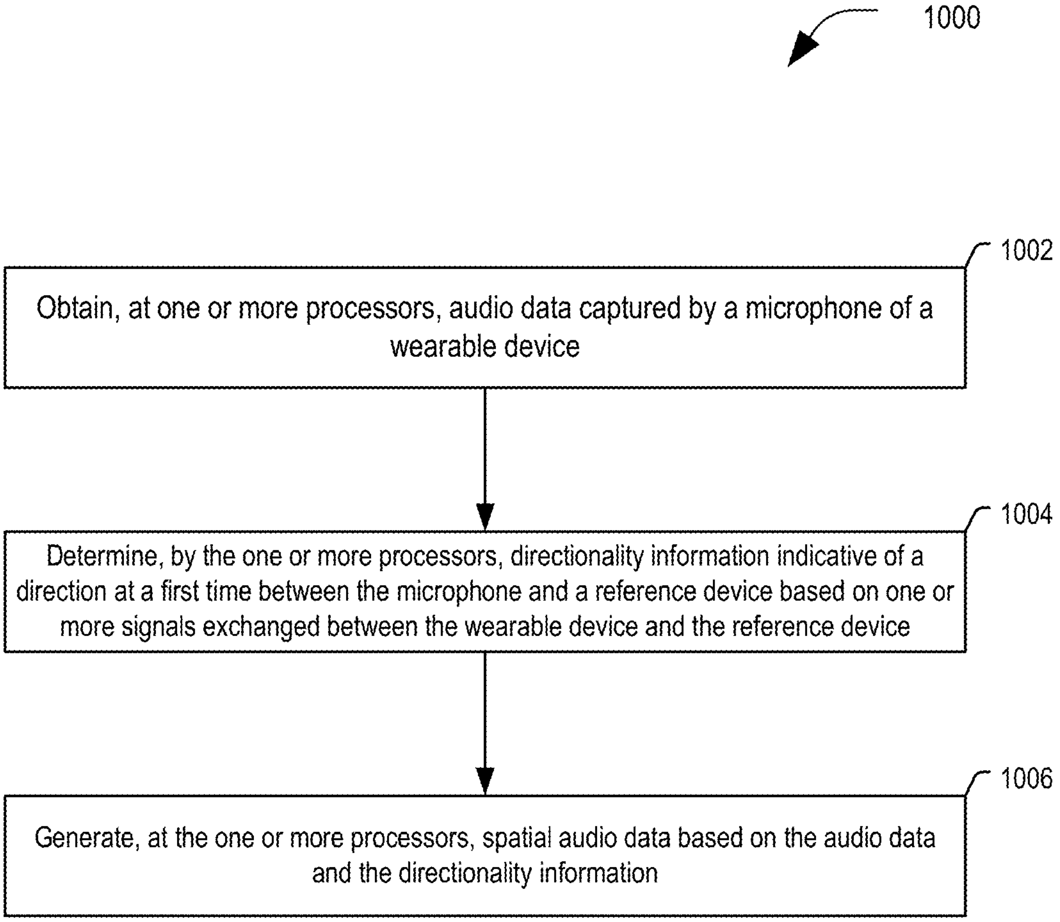

FIG. 10 is a diagram of a particular embodiment of a method of generating spatial audio data that may be performed by the system of FIG. 1 in accordance with some examples of the present disclosure.

Figure 11:
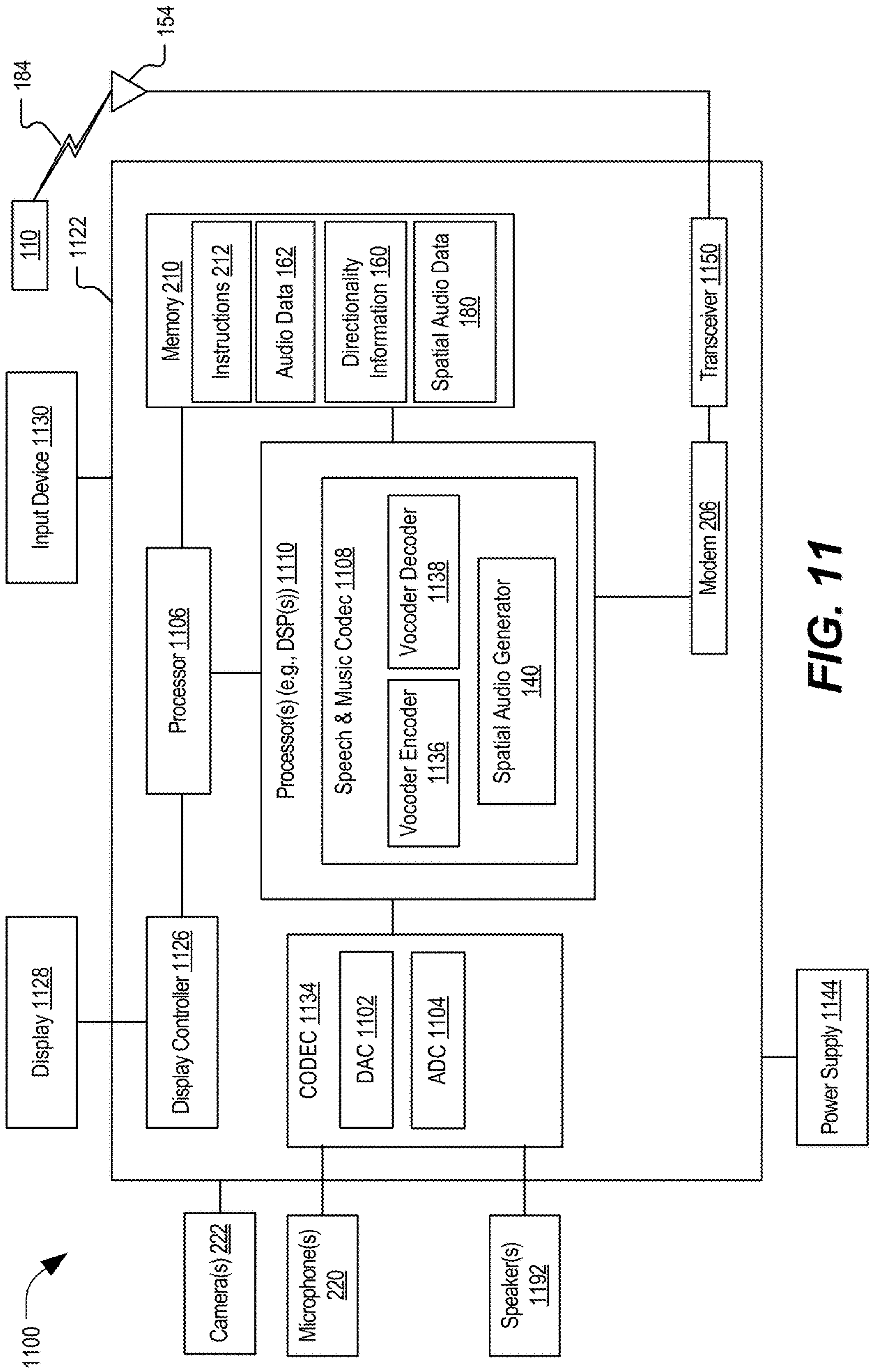

FIG. 11 is a block diagram of a particular illustrative example of a device that is operable to generate spatial audio data in accordance with some examples of the present disclosure.

V. DETAILED DESCRIPTION

Complicated, special-purpose microphone arrays are usually used to capture spatial audio. For example, the typical set up to capture sound to generate a first-order ambisonics representation of the sound includes at least four microphones including one omnidirectional microphone and three FIG. 8 microphones arranged to have lobes along mutually orthogonal axes. Because of the complexity and expense of such microphone arrays, it is challenging and cost prohibitive to generate spatial audio for everyday use, such as for use during teleconferences.

Although directional microphone arrays are complex and not in common use, wearable devices that include a microphone (or perhaps a few microphones) arranged to capture speech of a user are quite common and inexpensive. For example, wireless headphones, earbuds, headsets, extended reality (XR) devices (e.g., XR headsets and XR glasses), etc. are increasingly common and often used for audio capture, among other things. Aspects disclosed herein enable use of such devices (e.g., wireless wearable devices that include one or more microphones) to generate spatial audio data without the use of special-purpose directional microphone arrays.

For example, a wearable device with a microphone can be used in conjunction with a reference device. The wearable device can be configured such that the microphone is disposed at a fixed position relative to the user's mouth. To illustrate, the wearable device can be head mounted, such that when the user's head moves, the microphone also moves and remains stationary relative to the user's mouth. Alternatively, the wearable device can be configured such that movement of the user's mouth relative to the microphone is constrained. To illustrate, the wearable device can be chest mounted or coupled to a limb of the user, such that when the user's head moves, the microphone moves a small amount relative to the user's mouth.

The reference device and the wearable device can exchange signals, such as advertisement packets, beacon signals, or signals encoding audio data captured by the wearable device, and the reference device can use the signals to determine directionality information indicating a direction from the reference device to the wearable device. For example, the reference device can determine the angle of arrival of signals from the wearable device. As another example, the reference device can determine range information indicating a distance between the wearable device and the reference device.

The directionality information and the audio data captured by the wearable device can be used to generate spatial audio data, such as first-order ambisonics data. For example, the spatial audio data may represent the audio data as coming from a sound source that is at the location of the wearable device relative to the reference device. As the user moves relative to the reference device, a sound source represented in the spatial audio data moves due to the changing position of the wearable device relative to the reference device.

In some embodiments, the audio data can be sent from the wearable device to the reference device (or to another device) via the same signals as are used to determine the position of the wearable device relative to the reference device. In such examples, no additional processing burden is placed on the wearable device to enable generation of spatial audio data thereby conserving resources (e.g., battery power) of the wearable device and enabling the use of commonly available wearable devices to generate spatial audio data rather than special-purpose microphone arrays.

One problem with widespread use of 3D audio capture is the complexity and expense of 3D audio capture equipment. For example, many users capture audio using portable computing devices, such as smartphones, which are often too small to house a 3D audio capture microphone array. Further, many users use wireless headphones, earbuds, or other similar devices to capture audio data. Such devices are generally configured specifically for capturing speech of the user; accordingly, the microphones of such devices are usually configured to remain at a fixed position relative to the user's mouth to improve the quality of captured speech audio. One benefit of such devices is that they allow the user to move about the environment while capturing high-quality audio. A user's movement about the environment represents a circumstance in which 3D audio capture would be useful (e.g., to adapt audio output to represent the user's movement); however, it is problematic to capture 3D audio in this situation because of the fixed microphone position of a wireless device worn by the user, available microphones of a smartphone device, and the cost and complexity of special-purpose 3D audio capture equipment.

Disclosed embodiments provide a solution to these and other problems by generating spatial audio data using audio captured at a wearable device and directionality information based on signals exchanged between the wearable device and a reference device. For example, the user can move around the environment while speaking, while a reference device (such as a smartphone) exchanges signals with the wearable device. The distance, direction, or both, between the reference device and the wearable device are determined based on the signal exchange, and the audio data captured at the wearable device is modified based on the distance, direction, or both, to generate spatial audio data. For example, direction information can be determined based on the angle of arrival of the exchanged signals, distance information can be determined based on signal strength indicators associated with the exchanged signals, or both. Thus, one technical advantage of the disclosed embodiments is that low-cost and readily available audio capture equipment can be used to capture spatial audio data (e.g., 3D audio data). For example, the audio data can be processed to generate Ambisonics audio data (such as a 1st or 2nd order ambisonics representation of the audio captured at the wearable device).

Particular aspects of the present disclosure are described below with reference to the drawings. In the description, common features are designated by common reference numbers. As used herein, various terminology is used for the purpose of describing particular embodiments only and is not intended to be limiting of embodiments. For example, the singular forms "a." "an," and "the" are intended to include the plural forms as well, unless the context clearly indicates otherwise. Further, some features described herein are singular in some embodiments and plural in other embodiments. To illustrate, FIG. 1 depicts a device 192 including one or more processors ("processor(s)" 190 of FIG. 1), which indicates that in some embodiments the device 192 includes a single processor 190 and in other embodiments the device 192 includes multiple processors 190. For ease of reference herein, such features are generally introduced as "one or more" features and are subsequently referred to in the singular or optional plural (as indicated by "(s)") unless aspects related to multiple of the features are being described.

In some drawings, multiple instances of a particular type of feature are used. Although these features are physically and/or logically distinct, the same reference number is used for each, and the different instances are distinguished by addition of a letter to the reference number. When the features as a group or a type are referred to herein, e.g., when no particular one of the features is being referenced, the reference number is used without a distinguishing letter. However, when one particular feature of multiple features of the same type is referred to herein, the reference number is used with the distinguishing letter. For example, referring to FIG. 1, multiple locations are illustrated and associated with reference numbers 130A, 130B, and 130C. When referring to a particular one of these locations, such as a location 130A, the distinguishing letter "A" is used. However, when referring to any arbitrary one of these locations or to these locations as a group, the reference number 130 is used without a distinguishing letter.

As used herein, the terms "comprise." "comprises," and "comprising" may be used interchangeably with "include." "includes," or "including." Additionally, the term "wherein" may be used interchangeably with "where." As used herein, "exemplary" indicates an example, an embodiment, and/or an aspect, and should not be construed as limiting or as indicating a preference or a preferred embodiment. As used herein, an ordinal term (e.g., "first." "second." "third." etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled." "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some embodiments, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

FIG. 1 is a diagram of a particular illustrative aspect of a system 100 operable to generate spatial audio data 180 in accordance with some examples of the present disclosure. The system 100 includes a wearable device 110 that includes one or more microphones 120 ("mic(s)" in FIG. 1) and a reference device 150. The system 100 is configured to generate the spatial audio data 180 based on audio data 162 captured at the wearable device 110 while the wearable device 110 is worn by a user 112. In a particular aspect, the spatial audio data 180 represents relative positions of the reference device 150 and the user 112 and such relative positions may change over time (e.g., due to movement of the user 112).

The wearable device 110 is configured to be worn by the user 112 to capture sound 182 to generate the audio data 162. For example, the wearable device 110 can include a head-mounted device (e.g., a headset, earbuds, glasses, etc.) that includes the microphone(s) 120 configured to capture the sound 182 associated with speech of the user 112. In other examples, the wearable device 110 is configured to be worn on another portion of the user's body, such as on the user's chest or arm. In some embodiments, at least one of the microphone(s) 120 is operable to capture sound 182 generated by the user 112 while the user 112 moves relative to the reference device 150. As compared to movement of the user 112 relative to the reference device 150, the microphone(s) 120 remain stationary (or nearly stationary) relative to a source of sound 182 generated by the user 112. For example, when the wearable device 110 is a head-mounted device, the microphone(s) 120 can be disposed at a fixed location (during use) relative to the user's mouth to capture speech of the user 112. As another example, when the wearable device 110 is worn on the chest or a limb of the user 112, the microphone(s) 120 can move during audio capture (e.g., due to turning of the user's head); however, such motion results in a relatively small position change as compared to movement of the user 112 relative to the reference device 150, and as such, can be ignored in some embodiments.

The reference device 150 is configured to exchange one or more signals 184 with the wearable device 110 and to generate directionality information 160 based on the signal (s) 184. For example, in FIG. 1, the reference device 150 includes a communication system 152 coupled to one or more antennas 154. The communication system 152 is configured to send and/or receive the signals 184 via the antenna(s) 154 and to determine the directionality information 160 based on the signals 184.

In some embodiments, the reference device 150 may be integrated within a wireless access point configured to support a wireless local area network (WLAN), such as a WIFI® network (WI-FI® is a registered trademark of the Wi-Fi Alliance Corp., a California corporation). In other embodiments, the reference device 150 is integrated within a portable communication device, such as a smart phone. To illustrate, the portable communication device may be configured to support a WLAN or a personal area network (PAN), such as one or more Bluetooth communication links (BLUETOOTH® is a registered trademark of Bluetooth SIG, Inc., a Delaware Corporation).

In some embodiments, ranging information, angle of arrival information, or both, can be determined based on a received signal strength of one or more signals 184 at particular antennas 154. Additionally, or alternatively, the reference device 150 may be configured to determine a direction (e.g., an angle of arrival) using beamforming techniques, enabling the reference device 150 to use multilateration techniques to determine location coordinates of the wearable device 110. Further, in some embodiments, the reference device 150, the wearable device 110, or both, are within a coverage area of several access points of a WLAN (e.g., part of a mesh network), and one or more access points may determine location information associated with the reference device 150, the wearable device 110, or both, and exchange the location information with the reference device 150 to enable the reference device 150 to determine more accurate and/or more precise directionality information 160.

In some implementations, the reference device 150 can use phase-based ranging (based on the signals 184) to estimate the directionality information 160. One example of a phase-based ranging technique is high-accuracy distance measurement (HADM) based on Bluetooth Low-Energy (BLE) transmissions. Additionally, or alternatively, the reference device 150 can use signal strength-based techniques to estimate the directionality information 160. To illustrate, the signals 184 can include a transmission power indicator, and the reference device 150 can compare the transmission power indicator to a signal strength of the signal 184 as received at the reference device 150 to estimate ranging information. Multilateration based on the received signal strength or received signal strength fingerprinting for spatially diverse antennas can be used to estimate the directionality information 160.

In some embodiments, the wearable device 110 sends the signals 184 periodically or occasionally, and the reference device 150 determines the directionality information 160 based on an angle of arrival of the signals 184, ranging information associated with the signals 184, or both. For example, the reference device 150 can include two or more antennas 154, and the angle of arrival of the signals 184 can be determined based on phases of waveforms of the signals 184 as received at the two or more antennas 154. In some such embodiments, the reference device 150 can determine a received signal strength of the signals 184 and compare the received signal strength to a transmitted signal strength of the signals 184 to determine ranging information. In such embodiments, the transmitted signal strength of the signals 184 can be indicated in a data field of the signals 184 or can be determined based on prior agreement (e.g., based on a communication protocol specification or based on communication link set up data exchange between the wearable device 110 and the reference device 150). In some embodiments, the ranging information can be determined based on multiple factors, such as differences in angle of arrival of the signals 184 at multiple spatially diverse antennas 154 and signal strength information.

In some embodiments, the reference device 150 sends the signals 184 periodically or occasionally, and the wearable device 110 determines the directionality information 160 based on an angle of arrival of the signals 184, ranging information associated with the signals 184, or both, using similar techniques to those described above. In such embodiments, the wearable device 110 can send the directionality information 160 to the reference device 150.

In some embodiments, the wearable device 110 encodes the audio data 162 to generate a stream of data packets, and transmits the data packets via the signals 184. In such embodiments, the reference device 150 can determine the directionality information 160 based on signals (e.g., the signals 184) that encode the audio data 162. A device 192, the reference device 150, or both, may be configured to receive encoded data representing the audio data via the signals 184 and to decode the encoded data to generate the audio data 162. For example, the wearable device 110 can generate data packets that include data representing the audio data 162 and can transmit the data packets via the signals 184 using a wireless protocol, such as a BLUETOOTH® protocol, a WIFI® protocol, or another local area or personal area wireless communication protocol. In this example, the reference device 150 can receive the signals 184 and determine the directionality information based on the signals 184. The reference device 150, the device 192, or both, can also process the data packets to reconstruct the audio data 162.

In FIG. 1, the system 100 includes the device 192, which includes one or more processors 190 configured to generate the spatial audio data 180 based on the audio data 162 and the directionality information 160. For example, the processor(s) 190 of FIG. 1 include a spatial audio generator 140 that generates the spatial audio data as though the reference device 150 were a spatial audio recording device (e.g., a multimicrophone array) that was capturing sound from a sound source at a location 130 of the wearable device 110. To illustrate, the spatial audio generator 140 can include an ambisonics encoder that is configured to generate ambisonics data corresponding to the spatial audio data 180.

During operation of the system 100 in one example, the user 112 can walk about in a room or other space in which the reference device 150 is located while speaking. In this example, at a first time (TO), the user 112 is at a location 130A. As the user 112 speaks, the microphone(s) 120 of the wearable device 110 capture sound 182A representing the user's speech. The wearable device 110 processes the sound 182A to generate a portion of the audio data 162 that represents the sound 182A. The wearable device 110 transmits signals 184A representing the portion of the audio data 162 representing the sound 182A from the location 130A.

The reference device 150 receives the signals 184A and determines an angle of arrival of the signals 184A to determine a direction to the location 130A. Directionality information 160 for time TO includes an indication of the direction to the location 130A. Optionally, in some embodiments, the reference device 150 also determines range information based on a signal strength of the signals 184A (e.g., based on a received signal strength and a transmitted signal strength indicator). The range information indicates a distance to the location 130A. In such embodiments, directionality information 160 for time TO also includes the range information.

The spatial audio generator 140 receives the portion of the audio data 162 representing the sound 182A and the directionality information 160 for time TO, and determines a portion of the spatial audio data 180 for the time TO. For example, the spatial audio generator 140 can treat the portion of the audio data 162 representing the sound 182A as though it were captured by an ambisonics microphone array positioned at the reference device 150 from a sound source at the location 130A. In some embodiments, the spatial audio generator 140 receives the portion of the audio data 162 representing the sound 182A from the wearable device 110 (e.g., both the reference device 150 and the device 192 receive the signals 184A). In some embodiments, the spatial audio generator 140 receives the portion of the audio data 162 representing the sound 182A from the reference device 150.

At a time T1 (after time TO), the user 112 has moved to a location 130B. As the user 112 speaks at the location 130B, the microphone(s) 120 of the wearable device 110 capture sound 182B representing the user's speech. The wearable device 110 sends a portion of the audio data 162 representing the sound 182B via signals 184B from the location 130B.

The reference device 150 receives the signals 184B and determines the directionality information 160 for time T1 based on the angle of arrival of the signals 184B, signal strength information associated with the signals 184B, or both. The spatial audio generator 140 receives the portion of the audio data 162 representing the sound 182B and the directionality information 160 for time T1, and determines a portion of the spatial audio data 180 for the time T1. For example, the spatial audio generator 140 can treat the portion of the audio data 162 representing the sound 182B as though it were captured by an ambisonics microphone array positioned at the reference device 150 from a sound source at the location 130B.

Likewise, at a time T2 (after time T1), the user 112 has moved to a location 130C. As the user 112 speaks at the location 130C, the microphone(s) 120 of the wearable device 110 capture sound 182C representing the user's speech. The wearable device 110 sends a portion of the audio data 162 representing the sound 182C via signals 184C from the location 130C.

The reference device 150 receives the signals 184C and determines the directionality information 160 for time T2 based on the angle of arrival of the signals 184C, signal strength information associated with the signals 184C, or both. The spatial audio generator 140 receives the portion of the audio data 162 representing the sound 182C and the directionality information 160 for time T2, and determines a portion of the spatial audio data 180 for the time T2. For example, the spatial audio generator 140 can treat the portion of the audio data 162 representing the sound 182C as though it were captured by an ambisonics microphone array positioned at the reference device 150 from a sound source at the location 130C.

As the example above illustrates, the system 100 is able to generate spatial audio data 180 (such as ambisonics data) using a less complex microphone arrangement than is conventional for spatial audio capture. To illustrate, first-order ambisonics audio capture typically uses a multimicrophone array that includes special purpose microphones. As one example, an ambisonics microphone array can include an omnidirectional microphone and three FIG. 8 microphones, which are carefully positioned to have orthogonal main lobes. In contrast, the system 100 can capture first-order ambisonics data representing speech of the user 112 from various locations 130 using a single microphone on the wearable device 110. In some embodiments, the wearable device 110 can include additional microphones, which can be used to filter or otherwise modify the audio data 162 to emphasize or enhance audio components associated with target sounds (e.g., speech), to de-emphasize audio components associated with non-target sounds (e.g., noise), or both. Thus, an advantage of the system 100 is generation of spatial audio data 180 without special-purpose audio capture equipment.

Although particular communication protocols and corresponding networks are described with reference to FIG. 1, in other embodiments, the system 100 can use other types of communication protocols and/or networks. To illustrate, data exchange between the wearable device 110, the reference device 150, the device 192, and/or other devices (not shown) can use wide area wireless connection, often referred to as cellular connection or a mobile data connection, such as a connection conforming to a cellular voice and data network protocol from a 3rd Generation Partnership Project (3GPP) standards organization (e.g., a 3G, 4G, or 5G connection).

Although FIG. 1 illustrates the wearable device 110 as worn by a person (e.g., the user 112), in other embodiments, the wearable device 110 can be mounted on, coupled to, or integrated within another device that is associated with the user 112. For example, the wearable device 110 can be mounted on, coupled to, or integrated within a vehicle (e.g., an unmanned aerial vehicle) that uses a "follow-me" feature to track and follow the user 112 or in which the user 112 is riding. As another example, the wearable device can be mounted on, coupled to, or integrated within a non-human user, such as an animal, a robot, a vehicle, etc. and used to capture sounds 182 near the non-human user.

In various embodiments, the reference device 150, the device 192, or both, include, correspond to, or are included within a smart speaker, a speaker bar, a smart phone, a cellular phone, a laptop computer, a computer, a tablet, a personal digital assistant, a display device, a television, a gaming console, a music player, a radio, a digital video player, a tuner, a camera, a navigation device, a home automation system, a voice-activated device, a wireless speaker and voice activated device, a portable electronic device, a communication device, an internet-of-things (IoT) device, an extended reality (XR) device, a base station, or a mobile device. Additionally, or alternatively, in various embodiments, the wearable device 110 includes, corresponds to, or is included within a headset, an augmented reality headset, a mixed reality headset, a virtual reality headset, extended reality glasses, one or more earbuds, a wireless microphone device (e.g., a lapel microphone), etc.

Figure 2:
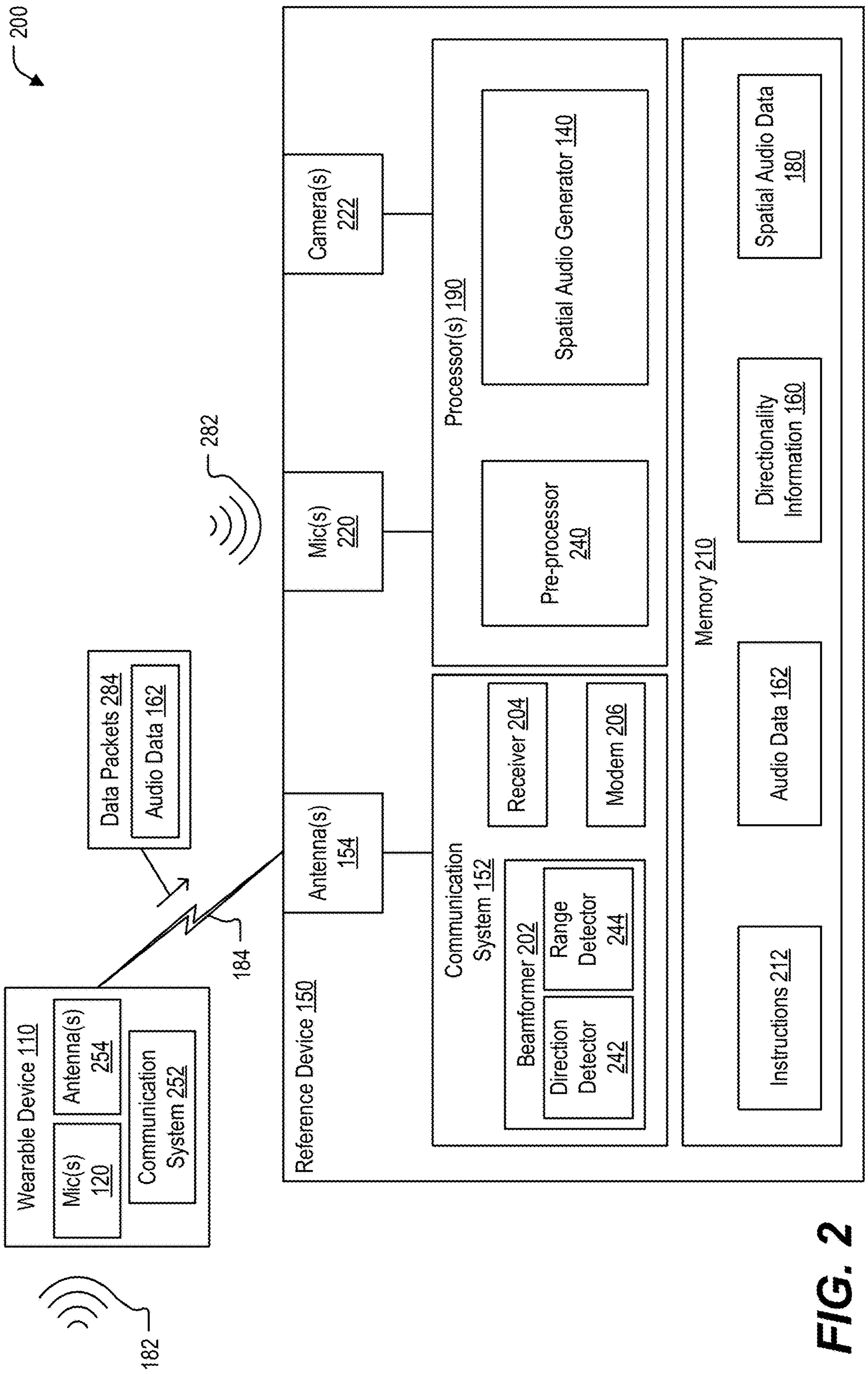
FIG. 2 is a block diagram of a particular illustrative aspect of the system of FIG. 1 in accordance with some examples of the present disclosure.

FIG. 2 is a block diagram of a system 200 that includes or corresponds to particular illustrative aspects of the system 100 of FIG. 1 in accordance with some examples of the present disclosure. In the example illustrated in FIG. 2, the reference device 150 and the device 192 of FIG. 1 are combined. For example, the reference device 150 of FIG. 2 includes the processor(s) 190, which include the spatial audio generator 140. FIG. 2 also illustrates additional details and optional components of the reference device 150.

In FIG. 2, the wearable device 110 includes the microphone(s) 120 to capture sound 182, such as speech of a user wearing the wearable device 110. The wearable device 110 of FIG. 2 also includes a communication system 252 coupled to one or more antennas 254. The communication system 252 is configured to send the signal(s) 184 via the antenna(s) 254 according to a wireless communication protocol, such as a BLUETOOTH® communication protocol, a WIFI® communication protocol, etc. In the example of FIG. 2, the wearable device 110 is configured to generate data packets 284 that include audio data 162 representing the sound 182, and the communication system 252 is configured to send the data packets 284 via the signals 184.

In FIG. 2, the reference device 150 includes the antenna(s) 154 coupled to the communication system 152. Further, as noted above, the reference device 150 includes the processor(s) 190, which include the spatial audio generator 140. In FIG. 2, the reference device 150 also includes a memory 210 coupled to the processor(s) 190. The memory 210 is configured to store, for example, the audio data 162, the directionality information 160, the spatial audio data 180, other data used by the reference device 150 to generate the spatial audio data 180, instructions 212 executable by the processor(s) 190, or any combination thereof.

As described with reference to FIG. 1, the antenna(s) 154 are configured to receive the signal(s) 184, and the communication system 152 is configured to determine directionality information 160 based on the signal(s) 184. For example, the communication system 152 of FIG. 2 includes a direction detector 242. The direction detector 242 is configured to determine a direction from the reference device 150 to the wearable device 110 based on the signal(s) 184. To illustrate, differences in the phases of the signal(s) 184 when received at two or more of the antenna(s) 154 can be used to determine an angle of arrival of the signal(s) 184. In this example, the angle of arrival of the signal(s) 184 corresponds to or represents the direction from the reference device 150 to the wearable device 110.

Optionally, the communication system 152 can also include a range detector 244. The range detector 244 is configured to determine a distance from the reference device 150 to the wearable device 110 based on the signal(s) 184. To illustrate, information indicative of attenuation of the signal(s) 184 can be used to determine the distance. As one example, the attenuation of the signal(s) 184 can be determined based on a received signal strength of the signal(s) 184 and a transmitted signal strength of the signal(s) 184. As another example, the communication system 152 can determine the distance and direction to the wearable device 110 based on phase and signal strength of the signal(s) 184 as received at spatially diverse antennas of the antenna(s) 154.

As another example, the communication system 152 can optionally include a beamformer 202. The beamformer 202 can include, be included within, or correspond to, or be coupled to the direction detector 242, the range detector 244, or both. In this example, the beamformer 202 may be configured to sweep one or more beams about an area around the reference device 150 to determine a direction from the reference device 150 to the wearable device 110, a distance from the reference device 150 to the wearable device 110, or both.

In FIG. 2, the communication system 152 also includes a receiver 204 and a modem 206. The receiver 204 and the modem 206 can be configured to process the signal(s) 184 received by the antenna(s) 154 to extract the audio data 162 from the signals 184. For example, the antenna(s) 154 can provide the receiver 204 with electrical signals corresponding to the signals 184, and the receiver 204 can amplify, filter, mix, or otherwise modify the electrical signals to generate a modulated signal. The modem 206 can demodulate the modulated signal to generate a bitstream representing the audio data 162 or the data packets 284. Depending on how the audio data 162 is sent, the communication system 152 can also include other components such as jitter buffers, analog-to-digital converters, etc., that are not shown in FIG. 2 for the sake of simplicity.

In some embodiments, the audio data 162 extracted from (or determined based on) the signal(s) 184 is stored at the memory 210 for processing by the processor(s) 190. In such embodiments, the directionality information 160 may also be stored at the memory 210. The directionality information 160 can include or correspond to direction information determined by the direction detector 242, range information determined by the range detector 244, or both.

The spatial audio generator 140 is configured to generate the spatial audio data 180 based on the audio data 162 and directionality information 160 associated with the audio data 162. In some embodiments, in addition to the spatial audio generator 140, the processor(s) 190 can include a pre-processor 240 that is configured to modify the audio data 162 and provide the modified audio data to the spatial audio generator 140. For example, the pre-processor 240 can perform operations to emphasize some audio components of the audio data 162 (e.g., target audio components), can perform operations to de-emphasize other audio components of the audio data 162 (e.g., non-target audio components), or both.

As an example, in FIG. 2, the reference device 150 includes one or more microphones 220 configured to capture sound 282 in an area around the reference device 150. In this example the sound 282 and the sound 182 may both include audio components representing non-speech sounds (e.g., noise) in an area that includes the reference device 150 and the wearable device 110. The pre-processor 240 may be configured to modify the audio data 162 based on the sound 282 captured at the microphone(s) 220 to de-emphasize, in the spatial audio data 180, audio components that are present in both the audio data 162 and in the sound 282 captured at the microphone(s) 220.

Optionally, the reference device 150 can include one or more sensors and the spatial audio data 180 can be processed in conjunction with data from the sensor(s) to form a multimedia stream that includes spatial audio. For example, in FIG. 2, the reference device 150 includes one or more cameras 222 that are configured to capture video data in an area around the reference device 150. In this example, the processor(s) 190 may be configured to process the video data in conjunction with the spatial audio data 180 and to encode the video data and the spatial audio data 180 for communication to another device.

In the description above, the audio data 162 is described as being transmitted via the same signal(s) 184 that are used to determine the directionality information 160; however, in other embodiments, different signals are used to determine the directionality information 160 than are used to transmit the audio data 162. For example, the reference device 150 can transmit signals that are received by the wearable device 110. In this example, the wearable device 110 can send information descriptive of the signals received from the reference device 150 to the reference device 150 for processing to determine the directionality information 160. To illustrate, the reference device 150 can periodically or occasionally transmit beacon signals or advertisement packets that are received by the wearable device 110. In this illustrative example, the wearable device 110 can send information such as angle of arrival, time of receipt, signal strength, etc., characteristic of the signals transmitted by the reference device 150 to the reference device 150, and the reference device 150 can determine the directionality information 160 based on the information. As another example, the wearable device 110 can transmit the audio data 162 via the data packets 284 and can also transmit other signals (e.g., advertisement packets, beacons signals, ranging and direction signals, etc.). In this example, the reference device 150 determines the directionality information 160 based on the other signals.

Figure 3:
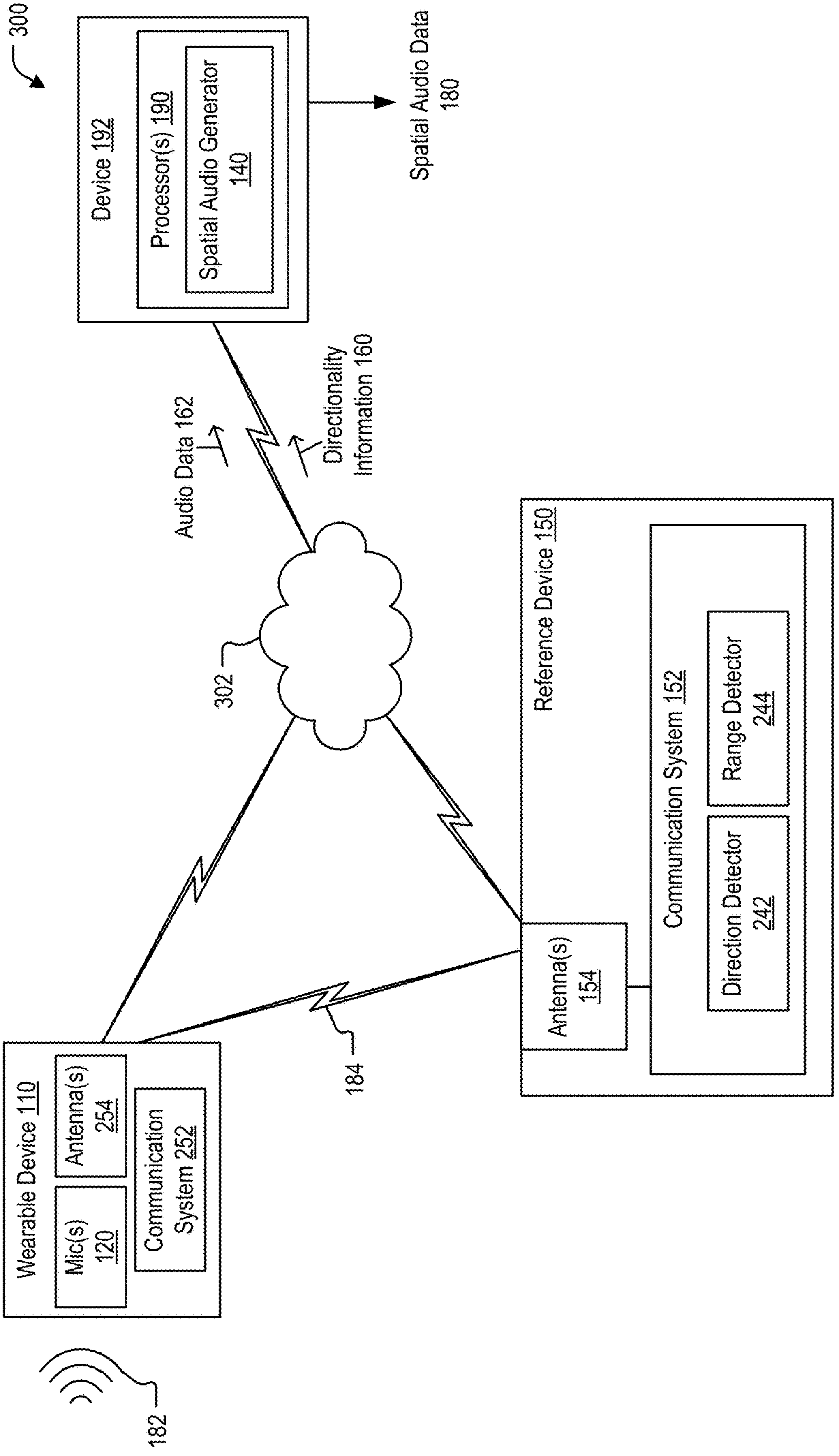
FIG. 3 is a block diagram of a particular illustrative aspect of the system of FIG. 1 in accordance with some examples of the present disclosure.

FIG. 3 is a block diagram of a system 300 that includes or corresponds to particular illustrative aspects of the system 100 of FIG. 1 in accordance with some examples of the present disclosure. In the example illustrated in FIG. 3, the device 192 is located remote from the wearable device 110 and the reference device 150. For example, the device 192 can communicate with the reference device 150, the wearable device 110, or both, via one or more networks 302. To illustrate, the device 192 can include or correspond to one or more server computing devices or cloud computing devices.

In FIG. 3, the wearable device 110 includes the microphone(s) 120 to capture the sound 182 (e.g., speech of a user wearing the wearable device 110), the communication system 252, and the antenna(s) 254. As described above, the communication system 252 is configured to exchange the signal(s) 184 with the reference device 150. In the example of FIG. 3, the communication system 252 may also be configured to send information, such as the audio data 162 to the device 192 via the network(s) 302.

In FIG. 3, the reference device 150 includes the antenna(s) 154 coupled to the communication system 152. The communication system 152 includes the direction detector 242, and optionally, may also include the range detector 244, each of which operate as described with reference to FIG. 2. The reference device 150 is configured to generate the directionality information 160 based on the signals 184 exchanged with the wearable device 110. As explained above, exchange of the signals 184 can include transmissions from the wearable device 110 received by the reference device 150, transmissions from the reference device 150 received by the wearable device 110, or both. The reference device 150 is configured to send the directionality information 160 to the device 192 via the network(s) 302. In some embodiments, the wearable device 110 sends the audio data 162 to the reference device 150, and the reference device 150 sends the audio data 162 to the device 192 via the network(s) 302.

In FIG. 3, the device 192 includes the processor(s) 190, which include the spatial audio generator 140. The spatial audio generator 140 is configured to generate the spatial audio data 180 based on the audio data 162 and the directionality information 160. In some embodiments, the device 192 is configured to provide the spatial audio data 180 as output to another device or to render the spatial audio data for consumption. For example, the device 192 can include a spatial audio renderer that is configured to generate output sound based on the spatial audio data 180. As another example, the device 192 can send the spatial audio data 180 to another device for storage, for further transmission, for output, etc. To illustrate, the device 192 can send the spatial audio data 180 to the reference device 150 or to the wearable device 110 via the network(s) 302. In this example, whichever of the reference device 150 or the wearable device 110 receives the spatial audio data 180 can store the spatial audio data 180 to a memory for later consumption or transmission, or can forward the spatial audio data 180 to another device.

As one example, during a call, the wearable device 110 can capture the sound 182 representing speech of a user and generate the audio data 162. The audio data 162 and associated directionality information 160 can be sent to the device 192 (e.g., a server) to generate the spatial audio data 180. The spatial audio data 180 can be sent back to the wearable device 110 or the reference device 150 for transmission to one or more other participants in the call. In this example, the spatial audio data 180 can be rendered by devices associated with the other participant(s) of the call such that movement of the user of the wearable device 110 within a space that includes the reference device 150 is rendered as movement of a sound source in the spatial audio data 180. To illustrate if the user of the wearable device 110 walks around a room that includes the reference device 150 while speaking, the spatial audio data 180 provided to the other participant(s) of the call reflects such movement.

Figure 4:
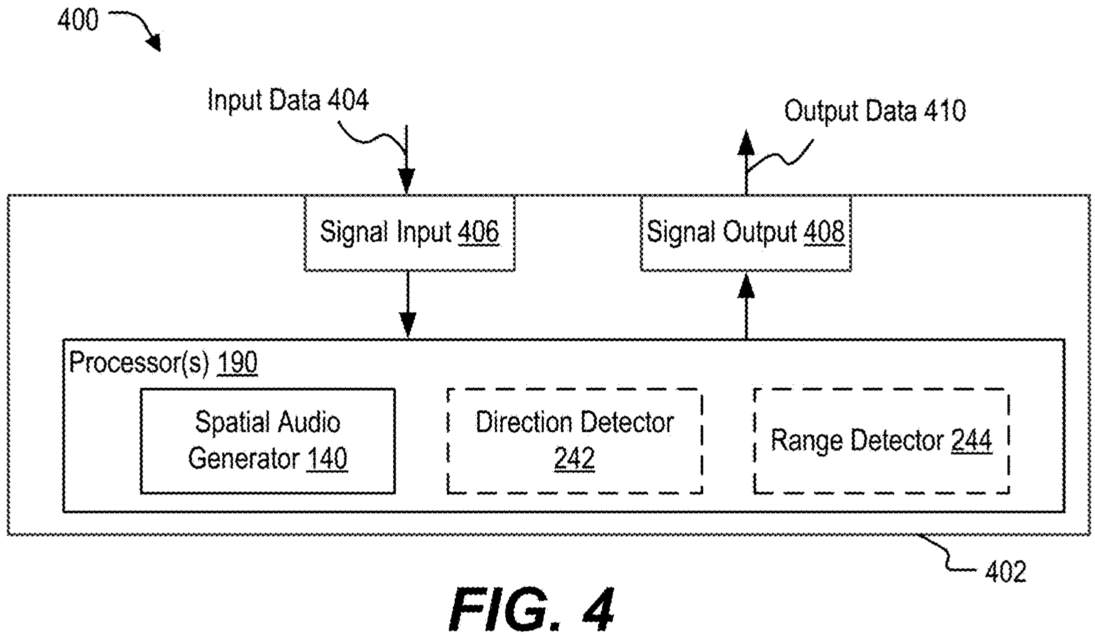
FIG. 4 illustrates an example of an integrated circuit operable to generate spatial audio data in accordance with some examples of the present disclosure.

FIG. 4 depicts an embodiment 400 of the device 192 as an integrated circuit 402 that includes the one or more processors 190. The processor(s) 190 in FIG. 4 include the spatial audio generator 140. The integrated circuit 402 also includes a signal input 406, such as one or more bus interfaces, to enable input data 404 to be received for processing. For example, the input data 404 can include the audio data 162 and the directionality information 160. As another example, the input data 404 can include the audio data 162 and information descriptive of the signal(s) 184, and the processor(s) 190 can determine the directionality information 160 based on characteristics of the signal(s) 184. To illustrate, the processor(s) 190 can optionally include the direction detector 242, the range detector 244, or both. The integrated circuit 402 also includes a signal output 408, such as a bus interface, to enable sending of output data 410, such as the spatial audio data 180.

FIGS. 5, 6, 7, 8, and 9 are diagrams illustrating various non-limiting examples of devices operable to interact to generate spatial audio data in accordance with some examples of the present disclosure. The specific devices and combinations of devices illustrated in FIGS. 5-9 are merely illustrative and are not limiting. In other embodiments, a system to generate spatial audio data according to aspects disclosed herein can include one or more different devices than are illustrated in FIGS. 5-9, a different arrangement of devices than illustrated in FIGS. 5-9, or both.

Figure 5:
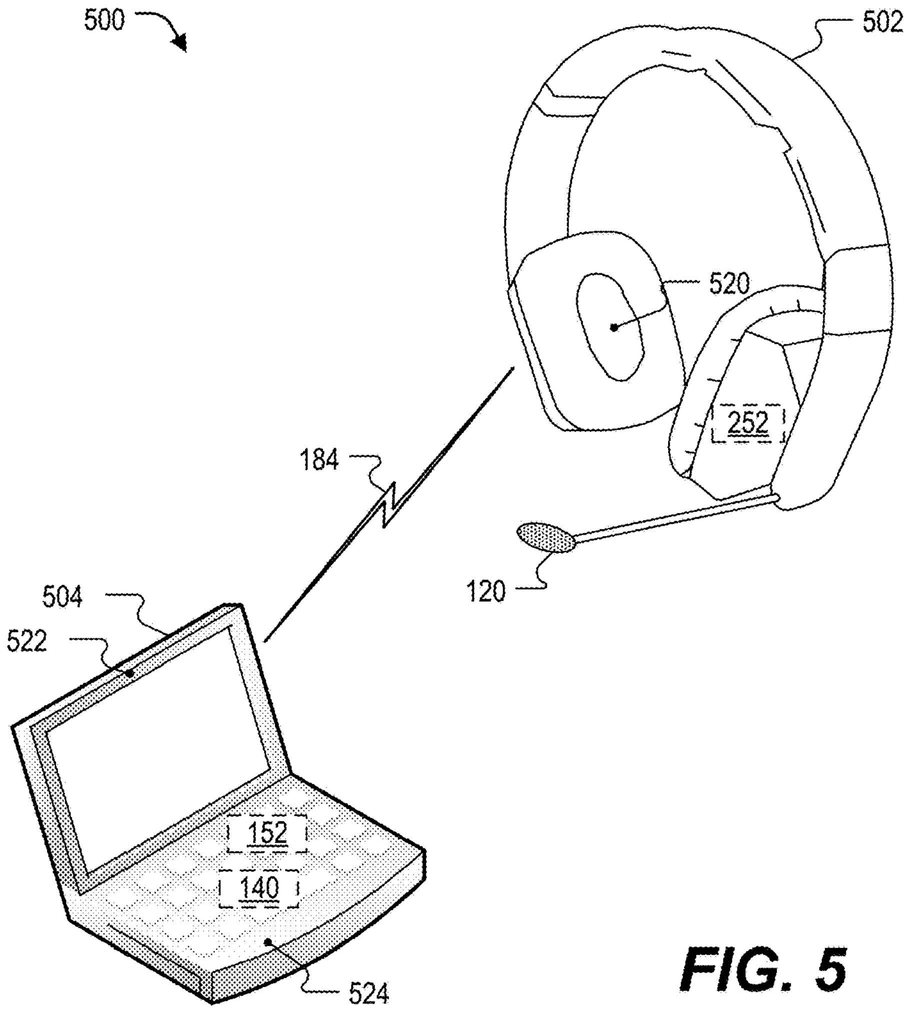

FIG. 5 depicts a system 500 in which the reference device 150 and the device 192 of FIG. 1 are integrated within a laptop computing device 504 and the wearable device 110 corresponds to a headset device 502. The headset device 502 includes the microphone(s) 120, one or more speakers 520, and the communication system 252. The laptop computing device 504 includes the communication system 152 and the spatial audio generator 140. The system 500 may optionally include other features of any of FIGS. 1-4.

In the example illustrated in FIG. 5, at least one of the microphone(s) 120 is positioned to capture sound corresponding to or including speech of a user wearing the headset device 502. The communication system 252 and the communication system 152 are configured to exchange the signals 184. In some embodiments, the signals 184 include audio data representing the sound captured by the microphone(s) 120. The signals 184 can also include other data, such as audio data sent by the laptop computing device 504 to the headset device 502 for output via the speaker(s) 520, directionality information, etc.

The communication system 152 is configured to determine information indicative of the position of the headset device 502 relative to the laptop computing device 504. For example, the communication system 152 can determine the directionality information 160. In some embodiments, the communication system 152 determines characteristics of the signals 184 that are related to an angle of arrival of the signals 184, characteristics of the signals 184 that are related to a range to the headset device 502, or both, and one or more other components of the laptop computing device 504 determine the directionality information. For example, in such embodiments the laptop computing device 504 may also include the direction detector 242, the range detector 244, or both, of FIG. 2. The spatial audio generator 140 is configured to generate spatial audio data (e.g., the spatial audio data 180 of FIG. 1) based on audio data captured by the microphone(s) 120 and the directionality information.

Although the laptop computing device 504 of FIG. 5 is illustrated as including both the communication system 152 and the spatial audio generator 140, in other embodiments, the laptop computing device 504 does not include the spatial audio generator 140. For example, in some such embodiments, the laptop computing device 504 includes the communication system 152, and the laptop computing device 504 is configured to send directionality information based on the signals 184, audio data from the headset device 502, or both, to a remote device, such as a server (e.g., the device 192 of FIG. 3). In this example, the remote device can include the spatial audio generator 140.

As one example, during use, a user of the headset device 502 can speak while moving relative to the laptop computing device 504. To illustrate, while on a call or a video conference, the user can move around a room. In this example, the spatial audio data can be generated such that a sound source corresponding to the user moves around in the spatial audio data, even though the user is not moving relative to the microphone(s) 120. Thus, the system 500 enables generation of spatial audio data without complicated, special-purpose microphone arrays.

Optionally, the laptop computing device 504 can include a camera 522. In embodiments in which the laptop computing device 504 includes the camera 522, the spatial audio data from the spatial audio generator 140 can be combined with video data from the camera 522 to generate a multimedia stream that includes the spatial audio data.

Optionally, the laptop computing device 504 can include one or more additional microphones 524. In embodiments in which the laptop computing device 504 includes the microphone(s) 524, audio data captured by the microphone(s) 524 can be used to modify the audio data captured by the microphone(s) 120, such as to de-emphasize noise components in the spatial audio data.

Figure 6:
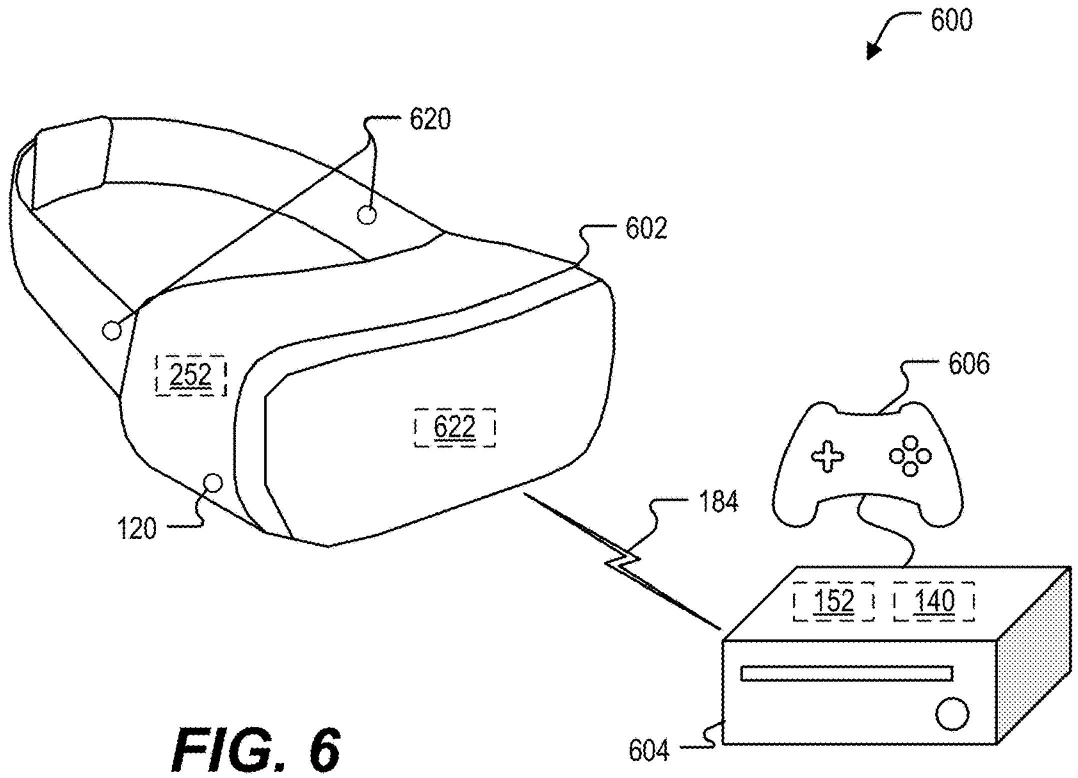

FIG. 6 depicts a system 600 in which the reference device 150 and the device 192 of FIG. 1 are integrated within a game console 604 and the wearable device 110 corresponds to an extended reality (XR) headset device 602. In this context, extended reality includes virtual reality, augmented reality, mixed reality, or combinations thereof. The XR headset device 602 is configured to be worn by a user such that a display 622 of the XR headset device 602 is positioned in front of the user's eyes. In FIG. 6, in addition to the display 622, the XR headset device 602 includes the microphone(s) 120, one or more speakers 620, and the communication system 252.

The game console 604 is configured to communicate with a game controller 606 and with the XR headset device 602. To illustrate, in FIG. 6, the game console 604 includes the communication system 152 which is configured to exchange the signals 184 with the communication system 252 of the XR headset device 602. In some embodiments, the game console 604 can send game information (e.g., control menus, in-game graphics, and game related audio) to the XR headset device 602 for output to the user via the display 622, the speaker(s) 620, or both. Additionally, the XR headset device 602 can generate audio data based on sound (e.g., speech of the user) detected by the microphone(s) 120. The communication system 252 of the XR headset device 602 can send the audio data to the game console 604 via the signals 184.

In some embodiments, multiple types of signals 184 can be exchanged by the XR headset device 602 and the game console 604. For example, in addition to game information and audio data, the signals 184 exchanged by the XR headset device 602 and the game console 604 can include ranging and/or positioning signals used by the communication system 152 and/or the spatial audio generator 140 to determine a direction and/or distance (e.g., the directionality information 160 of FIG. 1) between the XR headset device 602 and the game console 604. In some embodiments, a portion of the signals 184 including the game information and/or a portion of the signals 184 including the audio data is used to determine the direction and/or distance between the XR headset device 602 and the game console 604.

In some embodiments, the communication system 152 of the game console 604 is configured to determine information indicative of the position of the XR headset device 602 relative to the game console 604. For example, the communication system 152 can determine the directionality information 160. In some embodiments, the communication system 152 determines characteristics of the signals 184 that are related to an angle of arrival of the signals 184, characteristics of the signals 184 that are related to a range to the XR headset device 602, or both, and one or more other components of the game console 604 determine the directionality information. For example, in such embodiments the game console 604 may also include the direction detector 242, the range detector 244, or both, of FIG. 2. The spatial audio generator 140 is configured to generate spatial audio data (e.g., the spatial audio data 180 of FIG. 1) based on audio data captured by the microphone(s) 120 and the directionality information.

Although the game console 604 of FIG. 6 is illustrated as including both the communication system 152 and the spatial audio generator 140, in other embodiments, the game console 604 does not include the spatial audio generator 140. For example, in some such embodiments, the game console 604 includes the communication system 152, and the game console 604 is configured to send directionality information based on the signals 184, audio data from the XR headset device 602, or both, to a remote device, such as a server (e.g., the device 192 of FIG. 3). In this example, the remote device can include the spatial audio generator 140.

As one example, during use, a user of the XR headset device 602 can speak while moving relative to the game console 604. To illustrate, while playing a multiplayer game, the user can move around a room and speak to other players. In this example, the other players can receive spatial audio data in which a sound source corresponding to the user moves around in the in-game audio, even though the user is not moving relative to the microphone(s) 120. Thus, the system 600 enables generation of spatial audio data without complicated, special-purpose microphone arrays.

Optionally, the system 600 can include other features of any of FIGS. 1-4. For example, the game console 604 can include a camera, one or more microphones, or a combination thereof.

Figure 7:
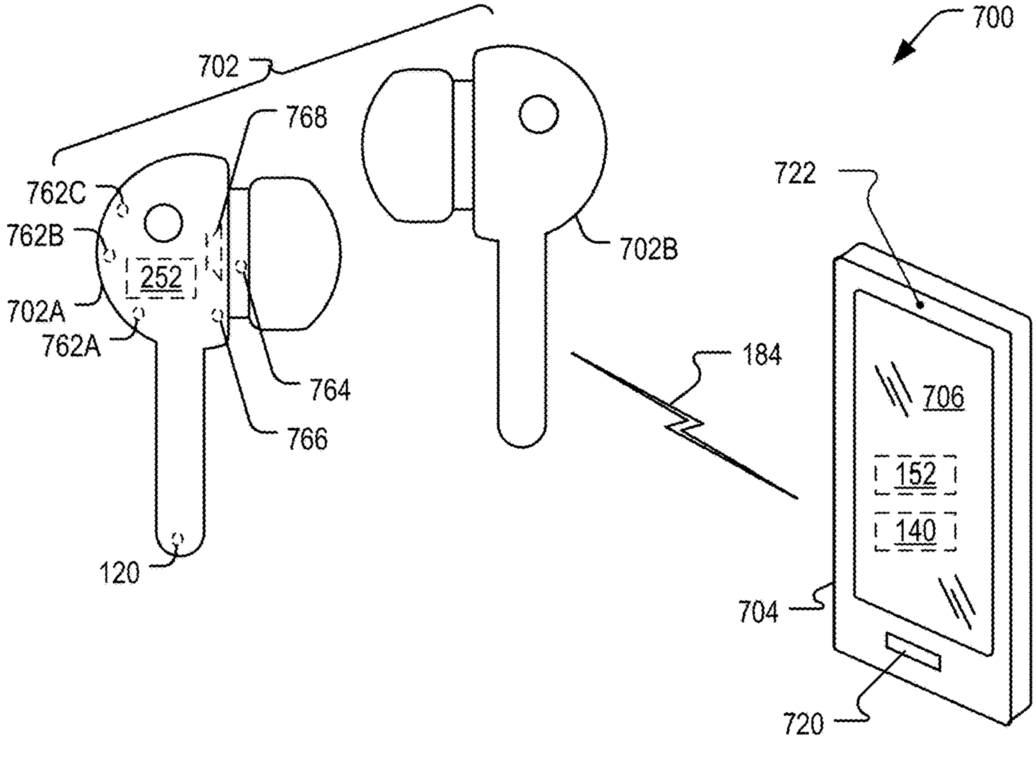

FIG. 7 depicts a system 700 in which the reference device 150 and the device 192 of FIG. 1 are integrated within a mobile communication device 704 (e.g., a smart phone) and the wearable device 110 corresponds to a pair of earbuds 702. At least one of the earbuds 702 includes the microphone(s) 120, one or more speakers 768, and the communication system 252. The mobile communication device 704 includes the communication system 152 and the spatial audio generator 140. The system 700 may optionally include other features of any of FIGS. 1-4.

In the example illustrated in FIG. 7, the earbuds 702 include an earbud 702A and an earbud 702B. The earbud 702A includes the microphone(s) 120, which in this example can include a high signal-to-noise microphone positioned to capture the voice of a wearer of the earbud 702A. The earbud 702A can also include one or more other microphones configured to detect ambient sounds and spatially distributed to support beamforming, illustrated in FIG. 7 as microphones 762A, 762B, and 762C, an "inner" microphone 764 proximate to the wearer's ear canal (e.g., to assist with active noise cancelling), and a self-speech microphone 766, such as a bone conduction microphone configured to convert sound vibrations of the wearer's ear bone or skull into an audio signal. The earbud 702A also includes a speaker 768. The earbud 702B can be configured in a substantially similar manner as the earbud 702A.

In the example illustrated in FIG. 7, at least one of the microphone(s) 120 is positioned to capture sound corresponding to or including speech of a user wearing the earbud 702A. The communication system 252 and the communication system 152 are configured to exchange the signals 184. In some embodiments, the signals 184 include audio data representing the sound captured by the microphone(s) 120. The signals 184 can also include other data, such as audio data sent by the mobile communication device 704 to the earbuds 702 for output via the speaker 768, directionality information, etc.

The communication system 152 is configured to determine information indicative of the position of at least one of the earbuds 702 relative to the mobile communication device 704. For example, the communication system 152 can determine the directionality information 160 of FIG. 1.

In some embodiments, the communication system 152 determines characteristics of the signals 184 that are related to an angle of arrival of the signals 184, characteristics of the signals 184 that are related to a range to the earbud(s) 702, or both, and one or more other components of the mobile communication device 704 determine the directionality information. For example, in such embodiments the mobile communication device 704 may also include the direction detector 242, the range detector 244, or both, of FIG. 2. The spatial audio generator 140 is configured to generate spatial audio data (e.g., the spatial audio data 180 of FIG. 1) based on audio data captured by the microphone(s) 120 and the directionality information.

Although the mobile communication device 704 of FIG. 7 is illustrated as including both the communication system 152 and the spatial audio generator 140, in other embodiments, the mobile communication device 704 does not include the spatial audio generator 140. For example, in some such embodiments, the mobile communication device 704 includes the communication system 152, and the mobile communication device 704 is configured to send directionality information based on the signals 184, audio data from the earbuds 702, or both, to a remote device, such as a server (e.g., the device 192 of FIG. 3). In this example, the remote device can include the spatial audio generator 140.

As one example, during use, a user of the earbuds 702 can speak while moving relative to the mobile communication device 704. To illustrate, while on a call or a video conference, the user can move around a room. In this example, the spatial audio data can be generated such that a sound source corresponding to the user moves around in the spatial audio data, even though the user is not moving relative to the microphone(s) 120. Thus, the system 700 enables generation of spatial audio data without complicated, special-purpose microphone arrays.

Optionally, the mobile communication device 704 can include a camera 722. In embodiments in which the mobile communication device 704 includes the camera 722, the spatial audio data from the spatial audio generator 140 can be combined with video data from the camera 722 to generate a multimedia stream that includes spatial audio data.

Optionally, the mobile communication device 704 can include one or more additional microphones 720. In embodiments in which the mobile communication device 704 includes the microphone(s) 720, audio data captured by the microphone(s) 720 can be used to modify the audio data captured by the microphone(s) 120, such as to de-emphasize noise components in the spatial audio data.

Although the system 700 illustrates two earbuds 702 of a pair, in other embodiments, the system 700 can include a single earbud (e.g., the earbud 702A) that is configured to exchange the signals 184 with the mobile communication device 704. For example, the user can wear both earbuds 702, but only one of the earbuds 702 includes the communication system 252. Further, although FIG. 7 illustrates earbuds 702 configured to be worn with a portion that extends into or covers the user's ear canal, in other embodiments, the system 700 includes other in-ear or over-ear devices.

Figure 8:
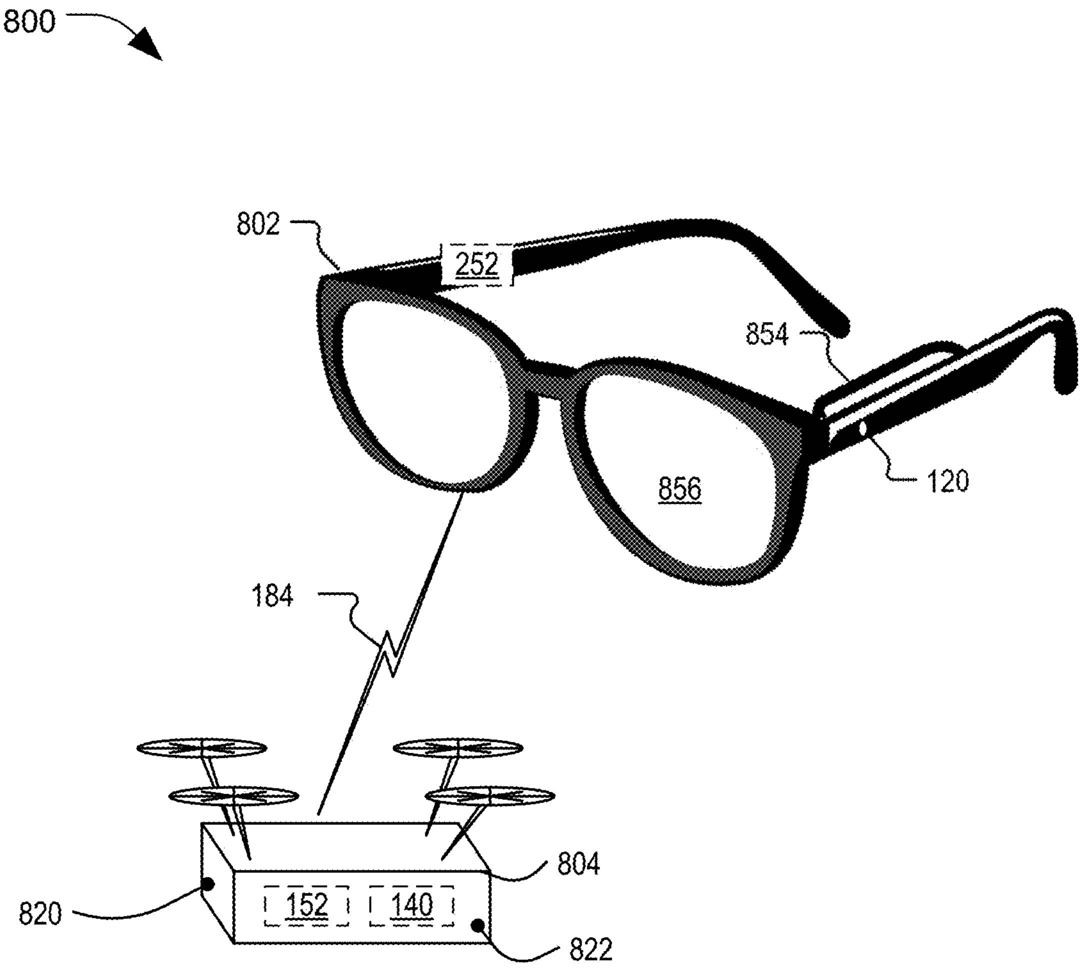

FIG. 8 depicts a system 800 in which the reference device 150 and the device 192 of FIG. 1 are integrated within a vehicle 804 (e.g., a piloted or unpiloted aerial vehicle, a car, a train, a bus, a ship or boat, etc.) and the wearable device 110 corresponds to XR glasses 802 (e.g., augmented-reality, mixed-reality, or virtual-reality glasses). XR glasses 802 includes the microphone(s) 120 and the communication system 252. The XR glasses 802 include a holographic projection unit 854 configured to project visual data onto a surface of a lens 856 or to reflect the visual data off of a surface of the lens 856 and onto the wearer's retina. The vehicle 804 includes the communication system 152 and the spatial audio generator 140. The system 700 may optionally include other features of any of FIGS. 1-4.

In the example illustrated in FIG. 8, at least one of the microphone(s) 120 is positioned to capture sound corresponding to or including speech of a user wearing the XR glasses 802. The communication system 252 and the communication system 152 are configured to exchange the signals 184. In some embodiments, the signals 184 include audio data representing the sound captured by the microphone(s) 120. The signals 184 can also include other data, such as data sent by the vehicle 804 to the XR glasses 802 for output to the user (e.g., via the holographic projection unit 854 or one or more speakers of the XR glasses 802).

The communication system 152 is configured to determine information indicative of the position of the XR glasses 802 relative to the vehicle 804. For example, the communication system 152 can determine the directionality information 160. In some embodiments, the communication system 152 determines characteristics of the signals 184 that are related to an angle of arrival of the signals 184, characteristics of the signals 184 that are related to a range to the XR glasses 802, or both, and one or more other components of the vehicle 804 determine the directionality information. For example, in such embodiments the vehicle 804 may also include the direction detector 242, the range detector 244, or both, of FIG. 2. The spatial audio generator 140 is configured to generate spatial audio data (e.g., the spatial audio data 180 of FIG. 1) based on audio data captured by the microphone(s) 120 and the directionality information.

Although the vehicle 804 of FIG. 8 is illustrated as including both the communication system 152 and the spatial audio generator 140, in other embodiments, the vehicle 804 does not include the spatial audio generator 140. For example, in some such embodiments, the vehicle 804 includes the communication system 152, and the vehicle 804 is configured to send directionality information based on the signals 184, audio data from the XR glasses 802, or both, to a remote device, such as a server (e.g., the device 192 of FIG. 3). In this example, the remote device can include the spatial audio generator 140.

As one example, during use, a user of the XR glasses 802 can speak while moving relative to the vehicle 804. To illustrate, while on a call or a video conference, the user can move around a scene. In this example, the spatial audio data can be generated such that a sound source corresponding to the user moves around in the spatial audio data, even though the user is not moving relative to the microphone(s) 120. Thus, the system 800 enables generation of spatial audio data without complicated, special-purpose microphone arrays.

In some embodiments, the vehicle 804 and the user of the XR glasses 802 move together. For example, the user can be a passenger of the vehicle 804. In such embodiments, the communication system 152 can be disposed on or in a portion of the vehicle 804 that the user moves with respect to. To illustrate, when the vehicle 804 is an aircraft, the user can move along an aisle of the aircraft. In some embodiments, the user of the XR glasses 802 can remain stationary and the vehicle 804 can move relative to the user. For example, the vehicle 804 can include an unmanned aerial vehicle (UAV) that is configured to move around a scene or around the user. In this example, the movement of the vehicle 804 relative to the user can be reflected in directionality information indicating the distance and/or direction from the vehicle 804 to the XR glasses 802. In this example, the spatial audio data represents a sound source associated with the user moving as the vehicle 804 moves. Alternatively, in some embodiments, the vehicle 804 includes an onboard positioning system (e.g., a local positioning system, a global positioning system, or both) configured to detect movement of the vehicle 804. In such embodiments, the movement of the vehicle 804 can be removed from the directionality information such that a sound source corresponding to the user is stationary in the spatial audio data when the vehicle 804 moves and the sound source moves when the user moves in a manner that changes the distance and/or direction from the vehicle 804 to the XR glasses 802.

Optionally, the vehicle 804 can include a camera 822. In embodiments in which the vehicle 804 includes the camera 822, the spatial audio data from the spatial audio generator 140 can be combined with video data from the camera 822 to generate a multimedia stream that includes spatial audio data.

Optionally, the vehicle 804 can include one or more additional microphones 820. In embodiments in which the vehicle 804 includes the microphone(s) 820, audio data captured by the microphone(s) 820 can be used to modify the audio data captured by the microphone(s) 120, such as to de-emphasize noise components in the spatial audio data.

Figure 9:
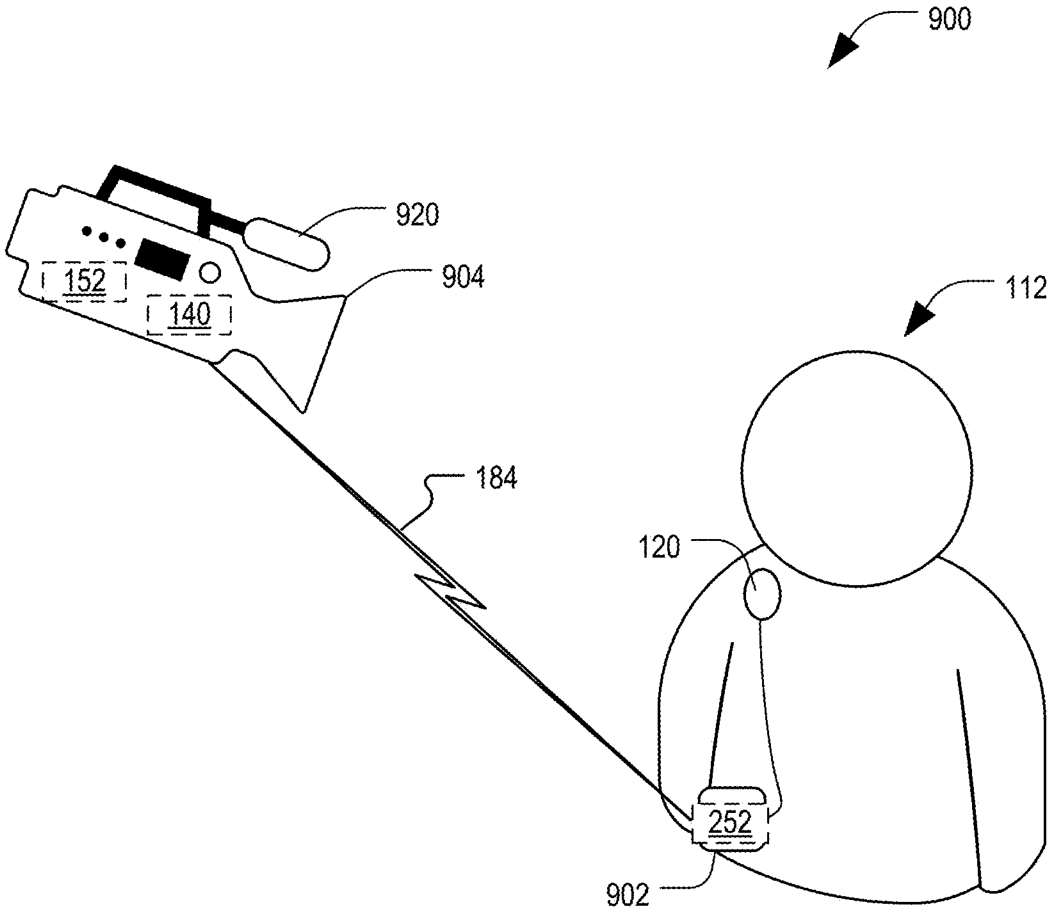

FIG. 9 depicts a system 900 in which the reference device 150 and the device 192 of FIG. 1 are integrated within a camera 904, and the wearable device 110 corresponds to a portable microphone device 902. The portable microphone device 902 includes the microphone(s) 120 and the communication system 252. In the particular example illustrated, at least one of the microphone(s) 120 is configured to be worn on the chest of the user 112 (e.g., as a lapel microphone), but in other embodiments, the microphone(s) 120 can be positioned elsewhere on the user's body or clothing. Further, in the example illustrated, the communication system 252 is disposed within a belt-mounted unit; however, in other embodiments, the communication system 252 and the microphone(s) 120 are disposed within a single housing, or the communication system 252 is configured to be worn elsewhere on the user's body or clothing.

The camera 904 includes the communication system 152 and the spatial audio generator 140. The system 900 may optionally include other features of any of FIGS. 1-4. For example, in FIG. 9, the camera 904 includes one or more microphones 920.

In the example illustrated in FIG. 9, at least one of the microphone(s) 120 is positioned to capture sound corresponding to or including speech of the user 112. The communication system 252 and the communication system 152 are configured to exchange the signals 184. In some embodiments, the signals 184 include audio data representing the sound captured by the microphone(s) 120. The signals 184 can also include other data.

The communication system 152 is configured to determine information indicative of the position of the portable microphone device 902 relative to the camera 904. For example, the communication system 152 can determine the directionality information 160. In some embodiments, the communication system 152 determines characteristics of the signals 184 that are related to an angle of arrival of the signals 184, characteristics of the signals 184 that are related to a range to the portable microphone device 902, or both, and one or more other components of the camera 904 determine the directionality information. For example, in such embodiments the camera 904 may also include the direction detector 242, the range detector 244, or both, of FIG. 2. The spatial audio generator 140 is configured to generate spatial audio data (e.g., the spatial audio data 180 of FIG. 1) based on audio data captured by the microphone(s) 120 and the directionality information.

Although the camera 904 of FIG. 9 is illustrated as including both the communication system 152 and the spatial audio generator 140, in other embodiments, the camera 904 does not include the spatial audio generator 140. For example, in some such embodiments, the camera 904 includes the communication system 152, and the camera 904 is configured to send directionality information based on the signals 184, audio data from the portable microphone device 902, or both, to a remote device, such as a server (e.g., the device 192 of FIG. 3). In this example, the remote device can include the spatial audio generator 140.

As one example, during use, a user of the portable microphone device 902 can speak while moving relative to the camera 904. To illustrate, while recording a video segment, the user can move around a scene. In this example, the spatial audio data can be generated such that a sound source corresponding to the user 112 moves around in the spatial audio data, even though the user 112 is not moving relative to the microphone(s) 120. Thus, the system 900 enables generation of spatial audio data without complicated, special-purpose microphone arrays. Optionally, the spatial audio data from the spatial audio generator 140 can be combined with video data from the camera 904 to generate a multimedia stream that includes spatial audio data. In embodiments in which the camera 904 includes the optional microphone(s) 920, audio data captured by the microphone(s) 920 can be used to modify the audio data captured by the microphone(s) 120, such as to de-emphasize noise components in the spatial audio data.

The examples illustrated in FIGS. 5-9 are merely intended to highlight specific use cases and configurations, and are not limiting. In particular, the wearable device 110 can include, correspond to, or be included within devices other than the headset device 502, the XR headset device 602, the earbuds 702, the XR glasses 802, and the portable microphone device 902 of FIGS. 5-9. In other non-limiting examples, the wearable device 110 can include, correspond to, or be included in devices such as a pendant or broach, a smart watch, a helmet, or an article of smart clothing. Likewise, the reference device 150 can include, correspond to, or be included within devices other than the laptop computing device 504, the game console 604, the mobile communication device 704, the vehicle 804, and the camera 904 of FIGS. 5-9. In other non-limiting examples, the reference device 150 can include, correspond to, or be included in devices such as a smart speaker, a speaker bar, a mobile communication device, a smart phone, a cellular phone, a laptop computer, a desktop computer, a tablet computer, a personal digital assistant device, a display device, a television, a gaming console, a music player, a radio, a digital video player, a digital video disc (DVD) player, a tuner, a camera, a navigation device, a vehicle, an aerial vehicle, a home automation system, a voice-activated device, a wireless speaker and voice activated device, a portable electronic device, a car, a computing device, a communication device, an internet-of-things (IoT) device, a base station, or any combination thereof. Further, as explained above, the reference device 150 and the device 192 of FIG. 1 can be integrated within a single device or distributed among two or more distinct devices that communicate with one another (e.g., via one or more local or wide area networks).

Referring to FIG. 10, a particular embodiment of a method 1000 of generating spatial audio data is shown. In a particular aspect, one or more operations of the method 1000 are performed by at least one of the wearable device 110, the reference device 150, the device 192, the communication system 152, the processor(s) 190, the spatial audio generator 140, the system 100 of FIG. 1, or a combination thereof. One technical benefit of the method 1000 is that the method 1000 enables generation of spatial audio data without complicated, special-purpose microphone arrays.

In a particular aspect, the method 1000 includes, at block 1002, obtaining, at one or more processors, audio data captured by a microphone of a wearable device. For example, a user can wear the wearable device in a manner that positions the microphone to capture speech or other sounds produced by the user. In this example, a communication system of the wearable device can send audio data representing the sound captured by the microphone to the reference device or to another device. To illustrate, the wearable device 110 of FIG. 1 can send the audio data 162 to the reference device 150, to the device 192, or both. In this example, the audio data 162 represents the sound 182 captured by the microphone(s) 120 of the wearable device 110.

The method 1000 also includes, at block 1004, determining, by the one or more processors, directionality information indicative of a direction between the microphone and the reference device based on one or more signals exchanged between the wearable device and the reference device. For example, the communication system 152 of the reference device 150 of FIG. 1 can determine the directionality information 160 based on the signals 184. The signals used determine the directionality information can include signals that encode the audio data or other signals, such as beacon signals or signals including advertisement packets. In some embodiments, the signals are transmitted in accordance with a data communication protocol, such as a BLUETOOTH® communication protocol or a WIFI® communication protocol.

The method 1000 includes, at block 1006, generating, at the one or more processors, spatial audio data (e.g., ambisonics data, such as first-order or higher-order ambisonics data) based on the audio data and the directionality information. For example, the directionality information can be used to specify a location of a sound source corresponding to the audio data. In this example, the sound source moves within the spatial audio data as the wearable device moves relative to the reference device. To illustrate, the microphone can be configured to capture sound corresponding to the audio data at a fixed location relative to a source of sound (e.g., the user's mouth). In this illustrative example, at a second time, the user can move to a different location, resulting in movement of the wearable device relative to the reference device. In this situation, the method 1000 can include determining updated directionality information based on one or more additional signals exchanged between the wearable device and the reference device. The method 1000 can also include generating updated spatial audio data based on the updated directionality information. In the updated spatial audio data movement over time of the wearable device relative to the reference device is represented as movement of the source of the sound.

In some embodiments, the one or more signals exchanged between the wearable device and the reference device include signals encoding the audio data. For example, the signal(s) can include encoded data representing the audio data (e.g., in a set of data packets), and the method 1000 can include decoding the encoded data to generate the audio data.

Determining the directionality information can include, for example, determining an angle of arrival of the one or more signals. In this example, the angle of arrival corresponds to or indicates a direction from the reference device to the wearable device. Determining the directionality information can also, or alternatively, include determining range information indicative of a distance (or a change of distance) between the microphone and the reference device. To illustrate, the range information can be determined based on a signal strength indicator associated with the signals. For example, a transmitted signal strength of the signals can be compared to a received signal strength of the signals to estimate a distance traversed by the signals.

In some embodiments, the method 1000 can also include obtaining video data associated with the audio data, processing the video data in conjunction with the spatial audio data, and encoding the video data and the spatial audio data for transmission or storage. For example, the reference device 150 of FIG. 2 includes the camera(s) 222 which can capture video data associated with the audio data 162. In this example, the video data and the spatial audio data can be combined to generate a multimedia file or a multimedia stream.

In some embodiments, the audio data can be modified before the spatial audio data is generated. For example, the audio data can be modified to emphasize target audio components (e.g., speech), to de-emphasize non-target audio components (e.g., noise), or both. As one example, the reference device 150 of FIG. 2 includes the microphone(s) 220, which are configured to capture sound 282 near the reference device 150. In this example, the audio data 162 can be processed to de-emphasize, in the spatial audio data, audio components that are present in both the audio data 162 and in the sound 282 captured at microphone(s) 220 of the reference device 150.

The method 1000 of FIG. 10 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 1000 of FIG. 10 may be performed by a processor that executes instructions, such as described with reference to FIG. 11.

Referring to FIG. 11, a block diagram of a particular illustrative embodiment of a device is depicted and generally designated 1100. In various embodiments, the device 1100 may have more or fewer components than illustrated in FIG. 11. In an illustrative embodiment, the device 1100 corresponds to or includes the reference device 150, the device 192, or both, of FIG. 1. In an illustrative embodiment, the device 1100 may perform one or more operations described with reference to FIGS. 1-10.

In a particular embodiment, the device 1100 includes a processor 1106 (e.g., a CPU). The device 1100 may include one or more additional processors 1110 (e.g., one or more DSPs). In a particular aspect, the processor(s) 190 of FIG. 1 correspond to the processor 1106, the processors 1110, or a combination thereof. The processors 1110 may include a speech and music coder-decoder (CODEC) 1108 that includes a voice coder ("vocoder") encoder 1136, a vocoder decoder 1138, the spatial audio generator 140, or a combination thereof.

The device 1100 may include the memory 210 and a CODEC 1134. The memory 210 may include the instructions 212, that are executable by the one or more additional processors 1110 (or the processor 1106) to implement the functionality described with reference to the spatial audio generator 140. The device 1100 may include the modem 206 coupled, via a transceiver 1150, to the antenna(s) 154.

The device 1100 may include a display 1128 coupled to a display controller 1126. One or more speakers 1192, one or more microphones 220, or a combination thereof, which may be coupled to the CODEC 1134. The CODEC 1134 may include a digital-to-analog converter (DAC) 1102, an analog-to-digital converter (ADC) 1104, or both. In a particular embodiment, the CODEC 1134 may receive analog signals from the microphone(s) 220, convert the analog signals to digital signals using the analog-to-digital converter 1104, and provide the digital signals to the speech and music codec 1108. The speech and music codec 1108 may process the digital signals, and the digital signals may further be processed by the spatial audio generator 140. For example, audio components present in the digital signals can be subtracted from audio data received from the wearable device 110 to de-emphasize such audio components from spatial audio data generated by the spatial audio generator 140. In a particular embodiment, the speech and music codec 1108 may provide digital signals to the CODEC 1134. The CODEC 1134 may convert the digital signals to analog signals using the digital-to-analog converter 1102 and may provide the analog signals to the speaker(s) 1192.

In a particular embodiment, the device 1100 may be included in a system-in-package or system-on-chip device 1122. In a particular embodiment, the memory 210, the processor 1106, the processors 1110, the display controller 1126, the CODEC 1134, and the modem 206 are included in the system-in-package or system-on-chip device 1122. In a particular embodiment, an input device 1130 and a power supply 1144 are coupled to the system-in-package or the system-on-chip device 1122. Moreover, in a particular embodiment, as illustrated in FIG. 11, the display 1128, the input device 1130, the speaker(s) 1192, the microphone(s) 220, one or more cameras 222, the antenna(s) 154, and the power supply 1144 are external to the system-in-package or the system-on-chip device 1122. In a particular embodiment, each of the display 1128, the input device 1130, the speaker(s) 1192, the microphone(s) 220, the camera(s) 222, the antenna(s) 154, and the power supply 1144 may be coupled to a component of the system-in-package or the system-on-chip device 1122, such as an interface or a controller.

In a particular aspect, the system-in-package or system-on-chip device 1122 also includes a transceiver 1150 coupled to the modem 206 and the antenna(s) 154. The transceiver 1150, the modem 206, and possibly other component, correspond to the communication system 152 of FIG. 1. The communication system is operable to exchange the signals 184 with the wearable device 110, and the spatial audio generator 140 is operable to generate spatial audio data 180 based on audio data 162 from the wearable device 110 and directionality information 160 determined based on the signals 184.

The device 1100 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a computing device, a communication device, an internet-of-things (IoT) device, a virtual reality (VR) device, a base station, a mobile device, or any combination thereof.

In conjunction with the described embodiments, an apparatus includes means for obtaining audio data captured by a microphone of a wearable device. For example, the means for obtaining audio data captured by the microphone of the wearable device can include or correspond to the antenna(s) 154, the communication system 152, the reference device 150, the spatial audio generator 140, the processor(s) 190, the device 192, the pre-processor 240, the receiver 204, the modem 206, the beamformer 202, the direction detector 242, the range detector 244, one or more other circuits or components configured to obtain audio data captured by a microphone of a wearable device, or any combination thereof.

The apparatus also includes means for determining directionality information indicative of a direction between the microphone and a reference device based on one or more signals exchanged between the wearable device and the reference device. For example, the means for determining directionality information can include or correspond to the communication system 152, the reference device 150, the spatial audio generator 140, the processor(s) 190, the device 192, the receiver 204, the beamformer 202, the direction detector 242, the range detector 244, one or more other circuits or components configured to determine directionality information based on exchanged signals, or any combination thereof.

The apparatus also includes means for generating spatial audio data based on the audio data and the directionality information. For example, the means for generating the spatial audio data can include or correspond to the reference device 150, the spatial audio generator 140, the processor(s) 190, the device 192, one or more other circuits or components configured to generate the spatial audio data, or any combination thereof.

In some embodiments, a non-transitory computer-readable medium (e.g., a computer-readable storage device, such as the memory 210) includes instructions (e.g., the instructions 212) that, when executed by one or more processors (e.g., the processor(s) 190, the processor(s) 1110, or the processor 1106), cause the one or more processors to obtain audio data (e.g., the audio data 162) captured by a microphone (e.g., the microphone(s) 120) of a wearable device (e.g., the wearable device 110), determine directionality information (e.g., the directionality information 160) indicative of a direction between the microphone and a reference device (e.g., the reference device 150) based on one or more signals (e.g., the signals 184) exchanged between the wearable device and the reference device, and generate spatial audio data (e.g., the spatial audio data 180) based on the audio data and the directionality information.

Particular aspects of the disclosure are described below in sets of interrelated Examples:

According to Example 1, a device includes a memory configured to store audio data and one or more processors configured to: obtain the audio data captured by a microphone of a wearable device; determine, based on one or more signals exchanged between the wearable device and a reference device, directionality information indicative of a direction of the microphone relative to the reference device; and process the audio data based on the directionality information to generate spatial audio data.

Example 2 includes the device of Example 1, wherein the microphone captures the audio data at a fixed location relative to a source of sound, and wherein the one or more processors are configured to update the spatial audio data over time to represent movement of the wearable device relative to the reference device as movement of the source of the sound.

Example 3 includes the device of Example 1 or Example 2, wherein the one or more signals include encoded data, wherein the one or more processors are configured to receive the one or more signals and decode the encoded data to generate the audio data.

Example 4 includes the device of any of Examples 1 to 3, wherein the one or more processors are configured to obtain the audio data from one or more data packets of the one or more signals.

Example 5 includes the device of any of Examples 1 to 4, wherein the one or more processors are further configured to determine, based on a signal strength indicator associated with the one or more signals, range information indicative of a distance between the microphone and the reference device.

Example 6 includes the device of any of Examples 1 to 5, wherein the one or more processors are further configured to determine, based on a signal strength indicator associated with the one or more signals, a change of distance between the microphone and the reference device.

Example 7 includes the device of any of Examples 1 to 6, wherein the one or more processors are configured to determine the directionality information based on an angle of arrival of the one or more signals.

Example 8 includes the device of any of Examples 1 to 7 and further includes one or more antennas configured to transmit a signal of the one or more signals, to receive a signal of the one or more signals, or both.

Example 9 includes the device of any of Examples 1 to 8, wherein the one or more processors are further configured to determine, based on a received signal strength of the one or more signals, range information associated with a distance between the microphone and the reference device, wherein the audio data is processed further based on the range information to generate the spatial audio data.

Example 10 includes the device of any of Examples 1 to 9, wherein the spatial audio data includes ambisonics data.

Example 11 includes the device of any of Examples 1 to 10 and further includes a camera coupled to the one or more processors and configured to capture video data, wherein the one or more processors are configured to process the video data in conjunction with the spatial audio data and to encode the video data and the spatial audio data for communication to another device.

Example 12 includes the device of any of Examples 1 to 11 and further includes a second microphone coupled to the one or more processors, wherein the one or more processors are configured to modify the audio data based on sound captured at the second microphone.

Example 13 includes the device of Example 12, wherein the one or more processors are configured to modify the audio data to de-emphasize, in the spatial audio data, audio components that are present in both the audio data and in the sound captured at the second microphone.

Example 14 includes the device of any of Examples 1 to 13, wherein the one or more processors and the memory are integrated within the reference device.

Example 15 includes the device of any of Examples 1 to 13, wherein the one or more processors and the memory are integrated within the wearable device.

Example 16 includes the device of any of Examples 1 to 15, wherein the one or more processors and the memory are integrated into at least one of a smart speaker, a speaker bar, a smart phone, a cellular phone, a laptop computer, a computer, a tablet, a personal digital assistant, a display device, a television, a gaming console, a music player, a radio, a digital video player, a tuner, a camera, a navigation device, a headset, an augmented reality headset, a mixed reality headset, a virtual reality headset, a home automation system, a voice-activated device, a wireless speaker and voice activated device, a portable electronic device, a communication device, an internet-of-things (IoT) device, an extended reality (XR) device, a base station, or a mobile device.

Example 17 includes the device of any of Examples 1 to 16, wherein the wearable device corresponds to or includes a headset device or one or more earbuds.

According to Example 18, a method includes obtaining, at one or more processors, audio data captured by a microphone of a wearable device; determining, by the one or more processors, directionality information indicative of a direction between the microphone and a reference device based on one or more signals exchanged between the wearable device and the reference device; and generating, at the one or more processors, spatial audio data based on the audio data and the directionality information.

Example 19 includes the method of Example 18, wherein the microphone captures the audio data at a fixed location relative to a source of sound, and further including, after determining the directionality information, determining updated directionality information; and generating updated spatial audio data, wherein the updated spatial audio data represents movement over time of the wearable device relative to the reference device as movement of the source of the sound.

Example 20 includes the method of Example 18 or Example 19, wherein the one or more signals include signals encoding the audio data.

Example 21 includes the method of any of Examples 18 to 20, wherein the one or more signals include encoded data, and further comprising receiving the one or more signals and decoding the encoded data to generate the audio data.

Example 22 includes the method of any of Examples 18 to 21 and further includes determining, based on a signal strength indicator, range information indicative of a distance between the microphone and the reference device.

Example 23 includes the method of any of Examples 18 to 22 and further includes determining, based on a signal strength indicator, a change of distance between the microphone and the reference device.

Example 24 includes the method of any of Examples 18 to 23, wherein the directionality information is based on an angle of arrival of the one or more signals.

Example 25 includes the method of any of Examples 18 to 24, wherein the one or more signals are transmitted in accordance with a BLUETOOTH® communication protocol.

Example 26 includes the method of any of Examples 18 to 25 and further includes determining, based on a received signal strength of the one or more signals, range information associated with a distance between the microphone and the reference device, wherein the audio data is processed further based on the range information to generate the spatial audio data.

Example 27 includes the method of any of Examples 18 to 26, wherein the spatial audio data includes ambisonics data.

Example 28 includes the method of any of Examples 18 to 27 and further includes obtaining video data associated with the audio data; processing the video data in conjunction with the spatial audio data; and encoding the video data and the spatial audio data for transmission or storage.

Example 29 includes the method of any of Examples 18 to 28 and further includes modifying the audio data based on sound captured at a second microphone.

Example 30 includes the method of Example 29 and further includes modifying the audio data to de-emphasize, in the spatial audio data, audio components that are present in the audio data and in the sound captured at a microphone of the reference device.

According to Example 31, a non-transitory computer-readable device storing instructions that are executable by one or more processors to cause the one or more processors to obtain audio data captured by a microphone of a wearable device; determine directionality information indicative of a direction between the microphone and a reference device based on one or more signals exchanged between the wearable device and the reference device; and generate spatial audio data based on the audio data and the directionality information.

Example 32 includes the non-transitory computer-readable device of Example 31, wherein the microphone captures the audio data at a fixed location relative to a source of sound, and wherein the instructions are further executable to: after determining the directionality information, determine updated directionality information; and generate updated spatial audio data based on the updated directionality information, wherein the updated spatial audio data represents movement over time of the wearable device relative to the reference device as movement of the source of the sound.

Example 33 includes the non-transitory computer-readable device of Example 31 or Example 32, wherein the one or more signals include encoded data, wherein the instructions are further executable to decode the encoded data to generate the audio data.

Example 34 includes the non-transitory computer-readable device of any of Examples 31 to 33, wherein the audio data is obtained from one or more data packets of the one or more signals.

Example 35 includes the non-transitory computer-readable device of any of Examples 31 to 34, wherein the instructions are further executable to determine, based on a signal strength indicator, range information indicative of a distance between the microphone and the reference device.

Example 36 includes the non-transitory computer-readable device of any of Examples 31 to 35, wherein the instructions are further executable to determine, based on a signal strength indicator, a change of distance between the microphone and the reference device.

Example 37 includes the non-transitory computer-readable device of any of Examples 31 to 36, wherein the directionality information is based on an angle of arrival of the one or more signals.

Example 38 includes the non-transitory computer-readable device of any of Examples 31 to 37, wherein the one or more signals are transmitted in accordance with a BLUETOOTH® communication protocol.

Example 39 includes the non-transitory computer-readable device of any of Examples 31 to 38, wherein the instructions are further executable to determine, based on a received signal strength of the one or more signals, range information associated with a distance between the microphone and the reference device, wherein the audio data is processed further based on the range information to generate the spatial audio data.

Example 40 includes the non-transitory computer-readable device of any of Examples 31 to 39, wherein the spatial audio data includes ambisonics data.

Example 41 includes the non-transitory computer-readable device of any of Examples 31 to 40, wherein the instructions are further executable to obtain video data associated with the audio data; process the video data in conjunction with the spatial audio data; and encode the video data and the spatial audio data for transmission or storage.

Example 42 includes the non-transitory computer-readable device of any of Examples 31 to 41, wherein the instructions are further executable to modify the audio data based on sound captured at a second microphone.

Example 43 includes the non-transitory computer-readable device of Example 42, wherein the instructions are further executable to modify the audio data to de-emphasize, in the spatial audio data, audio components that are present in the audio data and in the sound captured at a microphone of the reference device.

According to Example 44, an apparatus includes means for obtaining audio data captured by a microphone of a wearable device; means for determining directionality information indicative of a direction between the microphone and a reference device based on one or more signals exchanged between the wearable device and the reference device; and means for generating spatial audio data based on the audio data and the directionality information.

Example 45 includes the apparatus of Example 44, wherein the microphone captures the audio data at a fixed location relative to a source of sound, and further includes means for determining updated directionality information after determining the directionality information; and means for generating updated spatial audio data based on the updated directionality information, wherein the updated spatial audio data represents movement over time of the wearable device relative to the reference device as movement of the source of the sound.

Example 46 includes the apparatus of Example 44 or Example 45, wherein the one or more signals include an encoded version of the audio data.

Example 47 includes the apparatus of any of Examples 44 to 46, wherein the audio data is obtained from one or more data packets of the one or more signals.

Example 48 includes the apparatus of any of Examples 44 to 47 and further includes means for determining, based on a signal strength indicator, range information indicative of a distance between the microphone and the reference device.

Example 49 includes the apparatus of any of Examples 44 to 48 and further includes means for determining, based on a signal strength indicator, a change of distance between the microphone and the reference device.

Example 50 includes the apparatus of any of Examples 44 to 49, wherein the directionality information is based on an angle of arrival of the one or more signals.

Example 51 includes the apparatus of any of Examples 44 to 50, wherein the one or more signals are transmitted in accordance with a BLUETOOTH® communication protocol.

Example 52 includes the apparatus of any of Examples 44 to 51 and further includes means for determining, based on a received signal strength of the one or more signals, range information associated with a distance between the microphone and the reference device, wherein the audio data is processed further based on the range information to generate the spatial audio data.

Example 53 includes the apparatus of any of Examples 44 to 52, wherein the spatial audio data includes ambisonics data.

Example 54 includes the apparatus of any of Examples 44 to 53 and further includes: means for obtaining video data associated with the audio data; means for processing the video data in conjunction with the spatial audio data; and means for encoding the video data and the spatial audio data for transmission or storage.

Example 55 includes the apparatus of any of Examples 44 to 54 and further includes means for modifying the audio data based on sound captured at a second microphone.

Example 56 includes the apparatus of Example 55 and further includes means for modifying the audio data to de-emphasize, in the spatial audio data, audio components that are present in the audio data and in the sound captured at a microphone of the reference device.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such embodiment decisions are not to be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:

memory configured to store audio data; and one or more processors configured to:

obtain the audio data captured by a microphone of a wearable device;

determine, based on one or more wireless communication signals exchanged between the wearable device and a reference device, directionality information indicative of a direction of the microphone relative to the reference device;

process the audio data based on the directionality information to generate spatial audio data that corresponds to the audio data coming from the direction of the microphone relative to the reference device; and transmit the audio data to an output device distinct from the wearable device and the reference device.

2. The device of claim 1, wherein the microphone captures the audio data at a fixed location relative to a source of sound, and wherein the one or more processors are configured to update the spatial audio data over time to represent movement of the wearable device relative to the reference device as movement of the source of the sound.

3. The device of claim 1, wherein the one or more wireless communication signals include encoded data, wherein the one or more processors are configured to receive the one or more wireless communication signals and decode the encoded data to generate the audio data.

4. The device of claim 1, wherein the one or more processors are configured to obtain the audio data from one or more data packets of the one or more wireless communication signals.

5. The device of claim 1, wherein the one or more processors are configured to determine the directionality information based on an angle of arrival of the one or more wireless communication signals.

6. The device of claim 1, further comprising one or more antennas configured to transmit a signal of the one or more wireless communication signals, to receive a signal of the one or more wireless communication signals, or both.

7. The device of claim 1, wherein the one or more processors are further configured to determine, based on a received signal strength of the one or more wireless communication signals, range information associated with a distance between the microphone and the reference device, wherein the audio data is processed further based on the range information to generate the spatial audio data.

8. The device of claim 1, wherein the spatial audio data includes ambisonics data.

9. The device of claim 1, further comprising a camera coupled to the one or more processors and configured to capture video data, wherein the one or more processors are configured to process the video data in conjunction with the spatial audio data and to encode the video data and the spatial audio data for communication to another device.

10. The device of claim 1, further comprising a second microphone coupled to the one or more processors, wherein the one or more processors are configured to modify the audio data based on sound captured at the second microphone.

11. The device of claim 10, wherein the one or more processors are configured to modify the audio data to de-emphasize, in the spatial audio data, audio components that are present in both the audio data and in the sound captured at the second microphone.

12. The device of claim 1, wherein the one or more processors and the memory are integrated within the reference device.

13. The device of claim 1, wherein the one or more processors and the memory are integrated within the wearable device.

14. The device of claim 1, wherein the one or more processors and the memory are integrated into at least one of a smart speaker, a speaker bar, a smart phone, a cellular phone, a laptop computer, a computer, a tablet, a personal digital assistant, a display device, a television, a gaming console, a music player, a radio, a digital video player, a tuner, a camera, a navigation device, a headset, an augmented reality headset, a mixed reality headset, a virtual reality headset, a home automation system, a voice-activated device, a wireless speaker and voice activated device, a portable electronic device, a communication device, an internet-of-things (IoT) device, an extended reality (XR) device, a base station, or a mobile device.

15. The device of claim 1, wherein the wearable device corresponds to or includes a headset device or one or more earbuds.

16. A method comprising:

obtaining, at one or more processors, audio data captured by a microphone of a wearable device;

determining, by the one or more processors, directionality information indicative of a direction between the microphone and a reference device based on one or more wireless communication signals exchanged between the wearable device and the reference device; and generating, at the one or more processors, spatial audio data based on the audio data and the directionality information that corresponds to the audio data coming from the direction of the microphone relative to the reference device; and transmitting the audio data to an output device distinct from the wearable device and the reference device.

17. The method of claim 16, wherein the microphone captures the audio data at a fixed location relative to a source of sound, and further comprising:

after determining the directionality information, determining updated directionality information; and generating updated spatial audio data, wherein the updated spatial audio data represents movement over time of the wearable device relative to the reference device as movement of the source of the sound.

18. The method of claim 16, wherein the one or more wireless communication signals include encoded data, and further comprising receiving the one or more wireless communication signals and decoding the encoded data to generate the audio data.

19. The method of claim 16, wherein the directionality information is based on an angle of arrival of the one or more wireless communication signals.

20. The method of claim 16, further comprising determining, based on a received signal strength of the one or more wireless communication signals, range information associated with a distance between the microphone and the reference device, wherein the audio data is processed further based on the range information to generate the spatial audio data.

21. The method of claim 16, wherein the spatial audio data includes ambisonics data.

22. The method of claim 16, further comprising:

obtaining video data associated with the audio data;

processing the video data in conjunction with the spatial audio data; and encoding the video data and the spatial audio data for transmission or storage.

23. The method of claim 16, further comprising modifying the audio data based on sound captured at a second microphone.

24. A non-transitory computer-readable device storing instructions that are executable by one or more processors to cause the one or more processors to:

obtain audio data captured by a microphone of a wearable device;

determine directionality information indicative of a direction between the microphone and a reference device based on one or more wireless communication signals exchanged between the wearable device and the reference device;

generate spatial audio data based on the audio data and the directionality information that corresponds to the audio data coming from the direction of the microphone relative to the reference device; and transmit the audio data to an output device distinct from the wearable device and the reference device.

25. The non-transitory computer-readable device of claim 24, wherein the microphone captures the audio data at a fixed location relative to a source of sound, and wherein the instructions are further executable to:

after determining the directionality information, determine updated directionality information; and generate updated spatial audio data based on the updated directionality information, wherein the updated spatial audio data represents movement over time of the wearable device relative to the reference device as movement of the source of the sound.

26. The non-transitory computer-readable device of claim 24, wherein the one or more wireless communication signals include encoded data, wherein the instructions are further executable to decode the encoded data to generate the audio data.

27. The non-transitory computer-readable device of claim 24, wherein the directionality information is based on an angle of arrival of the one or more wireless communication signals.

28. The non-transitory computer-readable device of claim 24, wherein the instructions are further executable to determine, based on a received signal strength of the one or more wireless communication signals, range information associated with a distance between the microphone and the reference device, wherein the audio data is processed further based on the range information to generate the spatial audio data.

29. The non-transitory computer-readable device of claim 24, wherein the spatial audio data includes ambisonics data.

30. An apparatus comprising:

means for obtaining audio data captured by a microphone of a wearable device;

means for determining directionality information indicative of a direction between the microphone and a reference device based on one or more wireless communication signals exchanged between the wearable device and the reference device;

means for generating spatial audio data based on the audio data and the directionality information that corresponds to the audio data coming from the direction of the microphone relative to the reference device; and means for transmitting the audio data to an output device distinct from the wearable device and the reference device.

* * * * *